(12) United States Patent
Kipersztok et al.

(10) Patent No.: US 10,504,030 B2
(45) Date of Patent: Dec. 10, 2019

(54) SYSTEMS, METHODS, AND COMPUTER PROGRAM PRODUCTS FOR GENERATING A QUERY SPECIFIC BAYESIAN NETWORK

(71) Applicant: The Boeing Company, Chicago, IL (US)

(72) Inventors: Oscar Kipersztok, Redmond, WA (US); Uri Nodelman, Baltimore, MD (US)

(73) Assignee: THE BOEING COMPANY, Chicago, IL (US)

( * ) Notice: Subject to any disclaimer, the term of this patent is extended or adjusted under 35 U.S.C. 154(b) by 865 days.

(21) Appl. No.: 14/809,179

(22) Filed: Jul. 25, 2015

(65) Prior Publication Data

US 2017/0024652 A1  Jan. 26, 2017

(51) Int. Cl.
  *G06N 5/04* (2006.01)
  *G06N 7/00* (2006.01)

(52) U.S. Cl.
  CPC .................................. *G06N 7/005* (2013.01)

(58) Field of Classification Search
  None
  See application file for complete search history.

(56) References Cited

U.S. PATENT DOCUMENTS

| | | |
|---|---|---|
| 6,029,195 A | 2/2000 | Herz |
| 6,574,537 B2 | 6/2003 | Kipersztok et al. |
| 7,092,927 B2 | 8/2006 | Clark et al. |
| 7,644,053 B2 | 1/2010 | Kipersztok et al. |
| 8,620,852 B1 | 12/2013 | Kipersztok et al. |
| 2004/0019575 A1 | 1/2004 | Talbot et al. |
| 2005/0028033 A1 | 2/2005 | Kipersztok et al. |
| 2005/0197992 A1 | 9/2005 | Kipersztok et al. |
| 2007/0018953 A1 | 1/2007 | Kipersztok |

(Continued)

FOREIGN PATENT DOCUMENTS

| | | |
|---|---|---|
| WO | WO 02/101555 A2 | 12/2002 |
| WO | WO 2004/042493 A2 | 5/2004 |

OTHER PUBLICATIONS

Peng et al. "Structure Search and Stability Enhancement of Bayesian Networks", ICDM 2003, pp. 8.*

(Continued)

*Primary Examiner* — Li Wu Chang
(74) *Attorney, Agent, or Firm* — Alston & Bird LLP

(57) ABSTRACT

Provided are improved systems, methods, and computer programs to facilitate predictive accuracy for strategic decision support using a query specific Bayesian network. An unconstrained domain model is defined by domain concepts and causal relationships between the domain concepts. Each causal relationship includes a value for the weight of causal belief for the causal relationship. In response to a query, the unconstrained domain model is transformed into a query specific Bayesian network for the domain model by identifying one or more cycles in the unconstrained domain model, eliminating the one or more cycles from the unconstrained domain model; identifying a sub-graph of the unconstrained domain model that is relevant to a query and creating one or more conditional probability tables that comprise the query specific Bayesian network.

20 Claims, 24 Drawing Sheets

(56) References Cited

U.S. PATENT DOCUMENTS

| | | |
|---|---|---|
| 2007/0094219 A1 | 4/2007 | Kipersztok |
| 2014/0108322 A1* | 4/2014 | Buchanan ............... G06N 5/02 706/50 |

OTHER PUBLICATIONS

U.S. Appl. No. 60/699,109, filed Jul. 14, 2005, In re: Kipersztok; entitled *System, Method and Computer Program to Predict the Likelihood, the Extent and Time of an Event Change Occurrence Using a Combination of Cognitive Causal Models With Reasoning and Text Processing for Knowledge Driven Decision Support.*

U.S. Appl. No. 60/549,823, filed Mar. 3, 2004; In re: Kipersztok et al., entitled *System, Method, and Computer Product for Combination of Cognitive Causal Models With Reasoning and Text Processing for Knowledge Driven Decision Support.*

Technology Review Journal Call for Papers for Spring/Summer 2003, (2002), p. 155.

Technology Review Journal, vol. 15, No. 1, Spring/Summer 2007, 3 pages.

European Search Report for Appl. No. EP 06 01 4663 dated Sep. 29, 2006.

Clark, P. et al., *A Knowledge-Rich Approach to Understanding Text About Aircraft Systems,* (2002), pp. 1-7.

Henrion, M., *Practical Issues in Constructing a Bayes' Belief Network,* Uncertainty in Artificial Intelligence, vol. 3, (1988) 132-139.

Geiger, D. et al., *Identifying Independence in Abyesian Networks,* Networks, vol. 20, (1990) 507-534.

Johnson, D. B., *Finding All The Elementary Circuits of a Directed Graph,* SIAM Journal of Computing, vol. 4, No. 1 (Mar. 1975), pp. 77-84.

Kipersztok, O., *A Tool That Uses Human Factors to Simplify Model Building and Facilitate More Accurate Strategic Decisions,* (undated), pp. 1-7.

Kipersztok, O. et al., Evidence-Based Bayesian Networks Approach to Airplane Maintenance, IEEE, (2002), pp. 2887-2891.

Mittermayer, M., *Forecasting Intraday Stock Price Trends with Text Mining Techniques, Proceeding of the 37th Hawaii International Conference on System Sciences,* IEEE, 2004, pp. 1-10.

Nodelman, U. et al., *Continuous Time Bayesian Networks,* (undated), pp. 1-10.

Nodelman, U. et al., *Learning Continuous Time Bayesian Networks,* Proceedings of the 19th Annual Conference on Uncertainty in Artificial Intelligence (UAI-03), pp. 1-8.

Sakurai, S. et al., *Analysis of Daily Business Reports Based on Sequential Text Mining Method,* IEEE International Conference on Systems, Man and Cybernetics, 2004, pp. 3279-3284.

Talbot, P. J. et al., *Computational Antiterrorism Solutions Using a General-Purpose Evidence Fusion Engine,* Technology Review Journal, Spring/Summer 2002, pp. 23-36.

Talbot, P. J., *Semantic Networks: A Unifying Framework for Multistrategy Reasoning,* Technology Review Journal Spring/Summer (2003), pp. 59-76.

Tarjan, R. E., *Enumeration of the Elementary Circuits of a Directed Graph,* SIAM Journal of Computing, 2:211-216 (1973.

Wang, H. et al., *User Interface Tools for Navigation in Conditional Probability Tables and Graphical Elicitation of Probabilities in Bayesian Networks,* Proceedings of the Sixteenth Annual Conference on Uncertainty and Artificial Intelligence (2000) 617-625.

Zanasi, A., *Text Mining: The New Competitive Intelligence Frontier. Real Cases in Industrial, Banking and Telecom/SMEs World.,* pp. 1-17.

Farry M, et al., "*An Experimental Procedure for Evaluating User-Centered methods for Rapid Bayesian Network Construction*", Proceedings of the 6th Bayesian Modeling Applications Workshop at the 24th Annual Conference on Uncertainty in AI: UAI 2008, Helsinki, Finland; (2008).

Kipersztok, O, "*Using Human Factors, Reasoning and Text Processing for Hypotheses Validation.*" Third International Workshop on Knowledge and Reasoning for Answering Questions. International Joint Conference in Artificial Intelligence, Hydrabad, India; (2007).

Kipersztok O, "*Combining Cognitive Causal Models with Reasoning and Text Processing Methods for Decision Support.*" Second Bayesian Modeling Applications Workshop at the Uncertainty in AI Conference, Banff Canada (2004).

Nodelman, U. et al., "*Continuous Time Bayesian Networks.*" Proceedings of the Eighteenth Conference on Uncertainty in Artificial Intelligence, pp. 378-387, (2002).

Pfautz J, et al., "*User-Centered Methods for Rapid Creation and Validation of Bayesian Networks*". In Proceedings of 5th Bayesian Applications Workshop at Uncertainty in Artificial Intelligence (UAI 07) (2007).

Rosen J. et al., "*Influence Net Modeling with Causal Strengths: An Evolutionary Approach,*" In the Proceedings of the 1990 Command and Control Research and Technology Symposium, Monterey CA (1996).

Tarjan, R. E., "*Depth-first search and linear graph algorithms*", SIAM Journal on Computing 1 (2): 146-160 (1972).

\* cited by examiner

CONCEPT SUMMARY

NAME: AIRLINE COSTS OF ACCIDENTS AND INCIDENTS.

DESCRIPTION:
AIRLINES INCUR COSTS SUCH AS COMPENSATION TO VICTIMS AND THEIR FAMILIES, COST A

KEY WORDS: PAYMENTS, ACCOUNTABLE

PARENTS:
AIRLINE LEGAL LIABILITY (1)
OCCURANCE OF AVIATION ACCIDENTS AND INCIDENTS (1)

CHILDREN:
AIRLINE DECIAION TO WITHOLD INFORMATION (0.6)
AIRLINE PROFIT (-0.3)

SYSTEMS, METHODS, AND COMPUTER PROGRAM PRODUCTS FOR GENERATING A QUERY SPECIFIC BAYESIAN NETWORK

TECHNOLOGICAL FIELD

Embodiments of the present disclosure relate generally to decision support systems and methods, and, more particularly, to systems, methods, and computer programs for facilitating predictive accuracy for strategic decision support using a query specific Bayesian network.

BACKGROUND

Information has quickly become voluminous over the past half century with improved technologies to produce and store increased amounts of information and data. The Internet makes this point particularly clear. Not only does the Internet provide the means for increased access to large amounts of different types of information and data, but when using the Internet, it becomes clear how much information has been produced and stored on presumably every possible topic, including typical sources such as articles, newspapers, web pages, entire web sites, white papers, government reports, industry reports, intelligence reports, and newsgroups and recently more prevalent sources of information such as web blogs, chat rooms, message exchanges, intercepted emails, and even transcriptions of intercepted phone conversations—essentially anything that is in written language form, or capable of being translated into, described, or otherwise represented by written language such as video, images, sound, speech, etc., and particularly those materials which are available in electronic format, such as text, images, and sound available online on the Internet, as well as from other sources. While one problem produced by this large amount of information is the ability to access a particular scope of information, another significant problem becomes attempting to analyze an ever-increasing amount of information, even when limited to a particular domain. A further problem becomes trying to predict, revise, and confirm hypotheses about events and changes in view of vast amounts of information, and identifying and organizing informational evidence to support any such hypotheses or justify any conclusions and decisions related to and based upon such hypotheses. And even further problem becomes trying to accurately employ temporal relationships to the vast amounts of information to facilitate strategic decision support.

Analysts are presented with increasing volumes of information and the continued importance to analyze all of this information, not only possibly in a particular field of study or domain, but possibly also information from additional domains or along the fringes of the focus domain. However, in a domain where decisions need to be made within a limited period of time and the information available is beyond the amount humans can potentially process, by hand or otherwise process manually, particularly in domains involving socio-economic and political systems and of strategic and competitive nature requiring strategic reasoning, decision makers and analysts can be prevented from fully understanding and processing the information.

Even before the quantity of information becomes an issue, it takes time for an analyst to compose a framework and understanding of the current state of a particular domain from documents that describe the domain. Particular issues are increasingly complex and require a deep understanding of the relationships between the variables that influence a problem and the timing related to those influences. Specific events and past trends may have even more complex implications on and relationships to present and future events. Analysts develop complex reasoning that is required to make determinations based upon the information available and past experience, and decision makers develop complex reasoning and rationale that is required to make decisions based upon the information and determinations of analysts and the intended result. These factors make it difficult for analysts and decision makers to observe and detect trends in complex business and socio-political environments, particularly in domains outside of their realm of experience and knowledge. Similarly, these factors make it difficult for analysts and decision makers to "learn" or "gain understanding" about a specific topic by synthesizing the information from large number of documents available to read. As opposed to, for example, engineers, physicists, or mathematicians who generally learn the concepts of their field by using the language of mathematics, in areas such as history, political science, law, economics, and the like, the medium in which to learn concepts is the use of "natural language" such as English. For the most part there are no formulas or like logic rules which can be established and followed. Even the semantics to capture and convey the domain knowledge are a complex challenge or unknown. Thus, it may become particularly challenging for an analyst or decision maker entering a new or modified domain and needing to "come up to speed" on the domain by, typically, reading huge amounts of material on top of merely understanding the domain. And analysts and decision makers have a limited amount of time to become familiar with, understand, and be able to analyze and/or make decisions based upon the new domain, making it difficult to make important decision based upon the analyst's or decision maker's ability to process all of the information and even more difficult to accurately predict timing of possible future events based upon known information.

Further burdening analysts and decision makers, increasing amounts and complexities of information available to analysts and decision makers require significantly more time to process and analyze. And much needed information to predict trends may be found in streams of text appearing in diverse formats available, but buried, online or in other sources. Thus, analysts may be forced to make determinations under time constraints and based on incomplete information. Similarly, decision makers may be forced to make decisions based on incomplete, inadequate, conflicting or, simply, poor or incorrect information or fail to respond to events in a timely manner. Such determinations and decisions can lead to costly and undesirable results. And a delay in processing information or an inability to fully process information can prevent significant events or information from being identified until it may be too late to understand or react. An inability to accurately predict timing of possible future events can further degrade decisions made by analysts.

BRIEF SUMMARY

Embodiments of the present disclosure provide systems, methods, and computer programs to facilitate predictive accuracy for strategic decision support. Embodiments of the present disclosure make it possible for a domain expert to build a domain model that captures the knowledge of the domain expert about the probabilistic relationships of the domain. With such knowledge of probabilistic relationships about the domain captured in a domain model, embodiments of the present disclosure make possible the use of advanced probabilistic models to reason about complex scenarios and the timing of events without the need for advanced training. More specifically, embodiments of the present disclosure simplify the effort involved in building Bayesian networks, such as Continuous Time Bayesian networks (CTBNs), of a domain model for making probabilistic predictions. To provide such functionality, embodiments of the present disclosure are configured to transform an unconstrained domain model into a query specific Bayesian network for the domain model.

In an example embodiment, a method is provided that includes providing an unconstrained domain model defined by domain concepts and causal relationships between the domain concepts. Each causal relationship includes a value for the weight of causal belief for the causal relationship. The method of this example embodiment also includes transforming, using processing circuitry and in response to a query, the unconstrained domain model into a query specific Bayesian network for the domain model. In this regard, the unconstrained domain model is transformed into a query specific Bayesian network by identifying one or more cycles in the unconstrained domain model, eliminating the one or more cycles from the unconstrained domain model; identifying a sub-graph of the unconstrained domain model that is relevant to the query and creating one or more conditional probability tables that comprise the query specific Bayesian network.

The method of an example embodiment identifies the sub-graph of the unconstrained domain model by pruning domain concepts that are irrelevant to the query. The method of an example embodiment also identifies the sub-graph of the unconstrained domain model by identifying the domain concepts that are relevant to the query. In an example embodiment, the method eliminates the one or more cycles by identifying the causal relationships between the domain concepts that are weak and removing the causal relationships between the domain concepts that are identified to be weak. The method of an example embodiment also identifies one or more cycles in the unconstrained domain model by identifying all cycles in the unconstrained domain model, and then eliminates the one or more cycles from the unconstrained domain model by eliminating all cycles from the unconstrained domain model.

The method of an example embodiment creates one or more conditional probability tables by creating a conditional probability table defining the causal relationship from a parent domain concept to a child domain concept by determining a probability of occurrence for a respective transition from each state of the parent domain concept to each state of the child domain concept. In another example embodiment, the method creates one or more conditional probability tables by creating a conditional probability table defining the causal relationship from a plurality of parent domain concepts to a child domain concept by determining a probability of occurrence for a respective transition from each combination of states of the parent domain concepts to each state of the child domain concept.

In addition, corresponding systems and computer programs are provided that facilitate strategic decision support in like manners as the above-described method embodiments. These and other embodiments of the present disclosure are described further below.

BRIEF DESCRIPTION OF THE DRAWINGS

FIG. 2D is a pictorial representation of a graphical user interface for providing a text description and defining causal relationships between domain concepts for creating a probabilistic causal domain model.

FIG. 2E is a pictorial representation of a graphical user interface for defining dimensional units of domain concepts for creating a probabilistic causal domain model.

DETAILED DESCRIPTION

Figure 1:
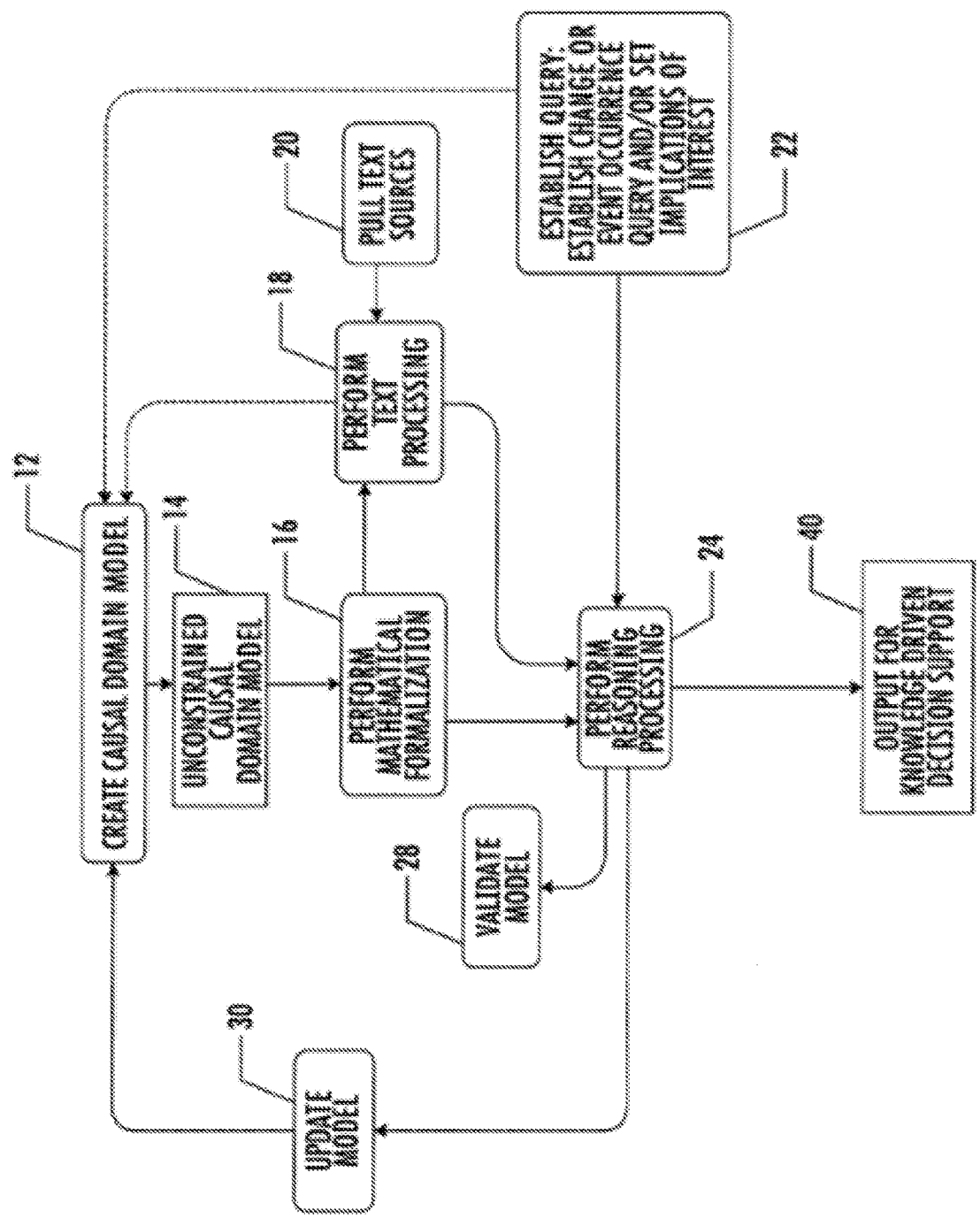
FIG. 1 is a diagram combining a probabilistic causal domain model with text and reasoning processing.

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

I. Probabilistic Causal Domain Models

Embodiments of the present disclosure extend the use of probabilistic causal domain models and related systems, methods, and computer program products described in U.S. Pat. No. 7,644,053, entitled "System, Method, and Computer Program Product for Combination of Cognitive Causal Models With Reasoning and Text Processing for Knowledge Driven Decision Support" and U.S. Pat. No. 8,620,852, entitled "Systems, Methods, and Computer Program Products for Predictive Accuracy for Strategic Decision Support," the contents of which are herein incorporated by reference in its entirety. Such probabilistic causal domain models may be used to predict the likelihood, extent, and/or time of an event or change occurrence as described in U.S. Patent Application Publication No. US 2007/0094219, entitled "System, Method, and Computer Program to Predict the Likelihood, the Extent, and the Time of an Event or Change Occurrence Using a Combination of Cognitive Causal Models with Reasoning and Text Processing for Knowledge Driven Decision Support" and U.S. Patent Application Publication No. US 2007/0018953, entitled "System, Method, and Computer Program Product for Anticipatory Hypothesis-Driven Text Retrieval and Argumentation Tools for Strategic Decision Support", the contents of which are incorporated by reference in their entireties. Probabilistic causal domain models are described in detail below so that they are readily understood in the context of domain models of some embodiments of the present disclosure that extend the use of probabilistic causal domain models to include temporal relationships including expected time to effect values that are used in related Continuous Time Bayesian Network formalisms.

Probabilistic causal domain models, and systems, methods, and computer programs for the creation of probabilistic causal domain models, may be used to gather and process large amounts of text that may be scattered among many sources, including online, and to generate basic understanding of the content and implications of important information sensitive to analysts or domain experts and decision makers, captured in a timely manner and made available for strategic decision-making processes to act upon emerging trends. A probabilistic causal domain model, and systems, methods, and computer programs for the creation of a probabilistic causal domain model, may be used to model complex relationships, process textual information, analyze text information with the model, and make inferences to support decisions based upon the text information and the model.

A probabilistic causal domain model can be described in terms of concepts of human language learning. For example, a subject matter expert (SME) or domain expert or analyst, hereinafter generally described as a domain expert, has existing knowledge and understanding of a particular domain. The domain expert will recognize and understand specific domain concepts and associated related words. These domain concepts and related words can be described as the vocabulary of the domain. Similarly, the domain expert will recognize and understand causal relationships between concepts of the domain. These relationships can be described as the grammar of the domain. Together, the domain concepts and causal relationships define the domain model. The domain model can be described as the language of the domain, defined by the vocabulary and grammar of the domain.

Systems, methods, and computer programs may combine a probabilistic causal domain model, a model encompassing causal relationships between concepts of a particular domain, with text processing in different ways to provide knowledge driven decision support. For example, a domain expert creating a causal model can use an initial defined corpus of text and articles to aid or assist in creation of the probabilistic causal domain model. Similarly, an initial defined corpus of text and articles may be mined manually, semi-automatically, or automatically to assist in building the model. For instance, the initial defined corpus of text and articles may be mined automatically to extract related words with increased relevance and to identify relationships between these relevant related words. If performed manually, a domain expert can filter through an accumulation of initial defined corpus of text and articles to create the probabilistic causal domain model by using the initial defined corpus of text to assist in identifying intuitive categories of events and states relevant to the domain to define domain concepts and to further create a probabilistic causal domain model by defining labels for domain concepts, attaching text descriptions to domain concepts, identifying related words for domain concepts, and building causal relationship between domain concepts.

Additional interaction between a probabilistic causal domain model and text processing may include the validation of the creation of a probabilistic causal domain model by processing an initial corpus of text and articles to determine whether the probabilistic causal domain model has been created in a manner acceptable to the domain expert such that the interaction of the probabilistic causal domain model and the text processing, and possibly also the reasoning processing, results in the expected or intended output. In this regard, a text search engine may be configured to search for evidential text to validate or corroborate the assumptions made in the hypothesis. If sufficient evidence is found in the text searched about the assumptions of the hypothesis, then the predictions of the model are considered more valid. This validation process may be accomplished at various points after the probabilistic causal domain model has been created as a corpus of articles changes over a period of time to reflect the present state of the domain. In this manner, a domain expert or user may update the probabilistic causal domain model as desired with information from reliable sources.

A further combination of a probabilistic causal domain model and text processing is to have the model serve as a filter to inspect text. This process is similar to the previously described updating of a probabilistic causal domain model except that by allowing the probabilistic causal domain model to serve as a filter to inspect text, the model and text processing may be set to run continuously or at periods of time, also referred to as the model being set on autopilot, to allow the model to filter the corpus of text as the corpus of text changes over time. In this regard, the hypothesis, as created from exercising the predictive power of the model, helps the user know what information is important to find as evidence from documents to substantiate the hypothesis and gather a solid case to justify a course of action based on the prediction. An autopilot filter method allows the model to identify instances for possible changes to the model itself. In this regard, the continuous search of text documents (that may be added continuously and in high volumes) would result in continuous corroboration of the weights of causal beliefs present in the model to decide whether the information from the text agrees, suggests a possible increase, or suggests a decrease in the parameter values. In this manner the model may automatically or semi-automatically update textual parameters of domain concepts and quantitative and numerical parameters of domain concepts. For example this process may be used semi-automatically to identify supplemental related paragraphs that may be presented to a domain expert to accept or decline as additional related paragraphs for justifying or rejecting domain concepts of the probabilistic causal domain model. Similarly, quantitative and/or numerical parameters of the domain model and of domain concepts may be automatically or semi-automatically updated, such as increasing or decreasing weights of causal relationships as identified and suggested by text and/or reasoning processing of a changing corpus of text in accordance with the domain model. In this manner, a probabilistic causal domain model may be perceived to learn and adapt from the changes in a domain similar to the manner in which a domain expert may learn additional information about the domain as the corpus of text and articles changes over a period of time and thereby adapt his or her analytical understanding of relationships and reasoning applicable to the domain. A system can also automatically and continuously formulate hypotheses based on model prediction and then process text to validate those hypotheses that are the most likely to be true. This can provide feedback to assess how the current state of the model is representative of the current state of the domain as portrayed by the corpus of document collected.

Embodiments of systems, methods and computer programs for combining cognitive causal models with reasoning and text processing for knowledge driven decision support are described below with respect to airline safety. However, probabilistic causal domain models may also be used in many domains and for a variety of applications, including, for example, competitive intelligence, homeland security, strategic planning, surveillance, reconnaissance, market and business segments, and intellectual property.

Although systems, methods, and computer programs for combining cognitive causal models with reasoning and text processing for knowledge driven decision support may proceed in various orders and commence with different routines, the embodiment of combining a probabilistic causal domain model with text and reasoning processing shown in and described with respect to FIG. 1 begins with creation of a probabilistic causal domain model, as shown at block 12. A probabilistic causal domain model is a model encompassing probabilistic causal relationships between concepts of a domain. A probabilistic causal domain model may also include further descriptive information and refinements attached to the model concepts and the probabilistic causal relationships, as described further below. The result of creating a probabilistic causal domain model is called an unconstrained probabilistic causal domain model 14. Certain mathematical algorithms, such as Bayesian belief networks or graphical probabilistic networks, cannot operate upon the unconstrained form of the domain model 14; thus, the unconstrained probabilistic causal domain model 14 must be transformed into a mathematical formalization of the unconstrained probabilistic causal domain model, as shown at block 16. Once a mathematical transformation occurs, text processing and predictive reasoning processing may be performed in accordance with the domain model, as shown at blocks 18 and 24. The text and reasoning processing may be used first to validate the model, as shown at block 28, for example, to ensure that the model has been created as desired, the mathematical formalization resulting from the transformation is accurate, and text processing and reasoning processing are performing as expected, as described further below. If necessary or optionally as described below, the probabilistic causal domain model may be updated for correction or improvement, as shown at block 30. When the proper probabilistic causal domain model is established, text sources may be searched and retrieved, as shown at block 20, for text processing, and a query may be established for reasoning processing, as shown at block 22. Using the formalization of the probabilistic causal domain model and the processing methods, a system, method, and/or computer program for combining cognitive causal models with reasoning and text processing provides an output for knowledge driven decision support 40. The previously described concepts of FIG. 1 are further described in FIGS. 2, 3, 4 and 6. If performed, prediction of likelihood, extent, and/or time of an event or change of occurrence is represented in FIG. 1 as the performance of reasoning processing at block 24, and the predicted likelihood, extent or impact, and/or time of the event or change of occurrence would be encompassed by the output for knowledge driven decision support at block 40.

A. Creating a Probabilistic Causal Domain Model

Figure 2A:
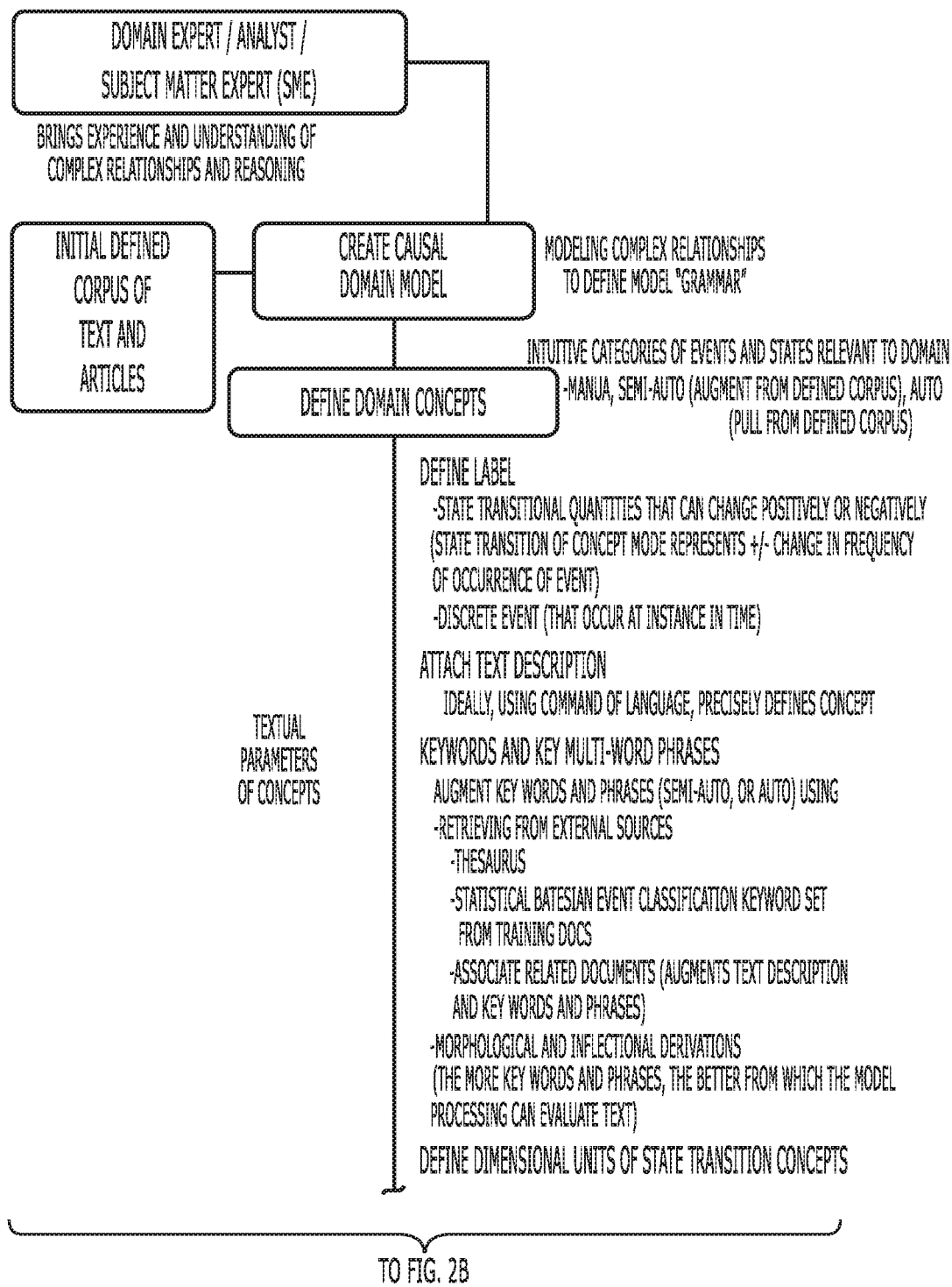
FIGS. 2A and 2B are diagrams of creating a probabilistic causal domain model.
Figure 2B:
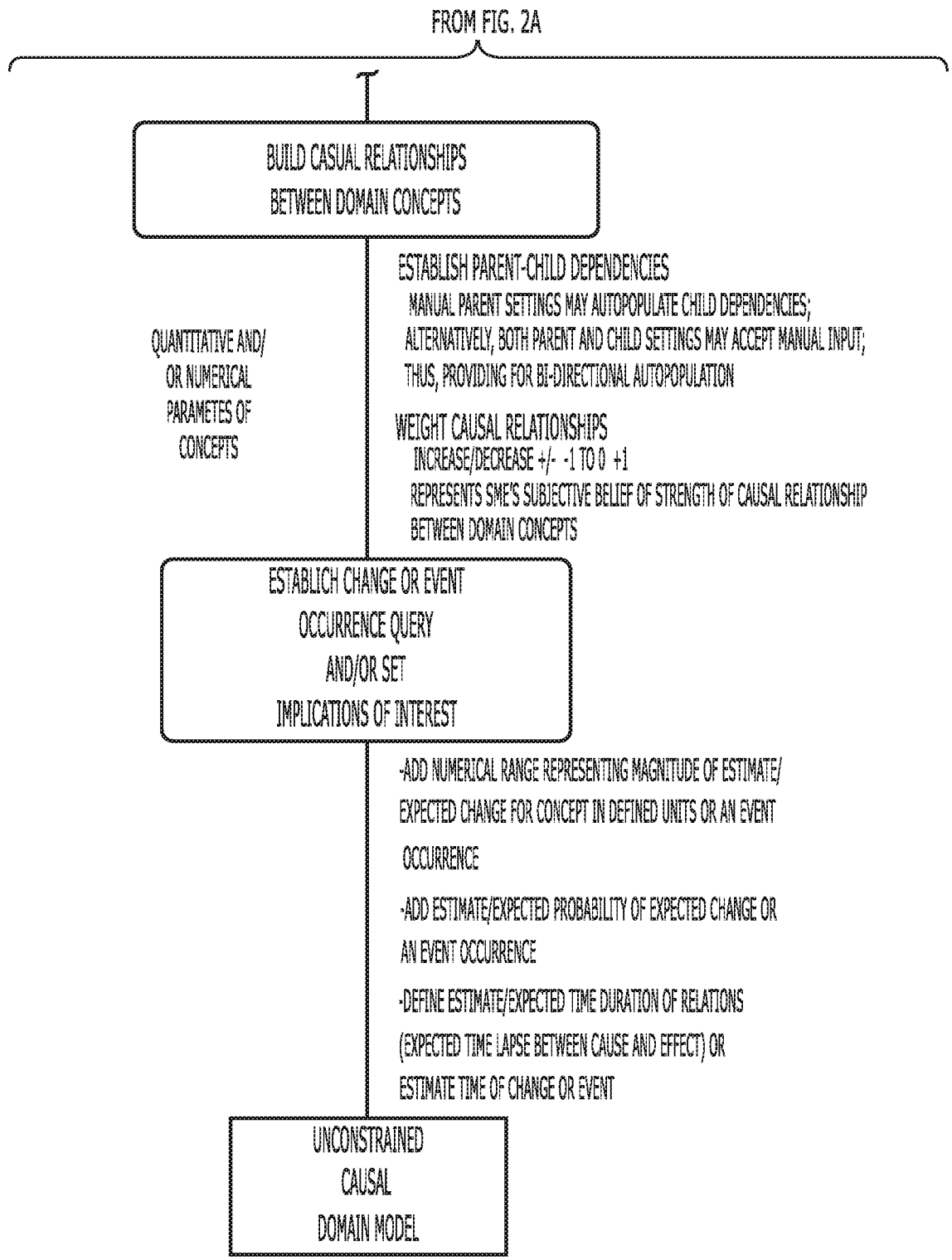

Rather than a domain expert working with a knowledge engineer to analyze data under the direction of the knowledge engineer, a domain expert may create a probabilistic causal domain model as shown in FIGS. 2A and 2B. The domain expert can bring experience and understanding of complex relationships and reasoning to an analytical tool without the need for a knowledge engineer. A task of the domain expert is to create a probabilistic causal domain model for a particular domain by modeling these complex probabilistic causal relationships to define a model grammar that may be used for text and reasoning processing. An interface may be used to assist the domain expert and simplify the creation of the probabilistic causal domain model. Examples of a graphical user interface and a display output are provided below. However, systems, methods, and computer programs for combining cognitive causal models with reasoning and text processing for knowledge driven decision support may include other interfaces and outputs, and, in one example embodiment, may include input via the Internet, representing embodiments of interfaces that may accept input indirectly, and an email output function, representing embodiments of outputs that may advantageously alert a user at a time after a query has been requested and perhaps repeatedly as new events occur or are thought to have been identified, such as instances in which a user has identified trends and thresholds relating to the public concern for airline safety and where a system, method, and/or computer program for combining cognitive causal models with reasoning and text processing for knowledge driven decision support identifies such a trend or threshold and emails to inform the user. For example, if a hypothesis asserts that evidence of increased accidents will cause an increase in public concern, detecting an increase in commercial aviation accidents will alert an analyst of an impending increase in public concern.

A graphical user interface (GUI) may be used by a domain expert to easily and rapidly create a probabilistic causal domain model. The graphical user interface, and other interfaces, may use commonalities and uniformity to allow for capture of complex causal dependencies by entry of the same type of information attached to each concept, regardless of the semantic meaning of the concept. For example, a graphical user interface may ensure that the probabilistic causal relationships of the model are correctly established. A graphical user interface provides a domain expert the ability to build and refine a probabilistic causal domain model in a manner that creates a probabilistic causal domain model that may be formalized and used for making predictions and for analyzing information related to the domain. Creating a probabilistic causal domain model includes defining domain concepts. Domain concepts are intuitive categories of events and states relevant to the domain. For example, with reference to FIG. 2C, "Airline Cost of Accidents and Incidents" and "Detection of Faulty Components" are intuitive categories of events and states relevant to the domain of airline safety, particularly relevant to public concern about airline safety. The concepts may be defined manually, semi-automatically, or automatically. If defined manually, a domain expert may provide the information about the concept. For example, a domain expert may identify and describe the domain and concepts thereof using labels, phrases, paragraphs and/or textual names. If defined semi-automatically, concepts may be identified by text and/or reasoning processing algorithms, as described further below, from a defined corpus and selectively accepted by a domain expert. For example, text and/or reasoning processing may identify concepts of a domain from relevance classification, event occurrence, and/or reasoning algorithms that may then be selected or rejected by a domain expert. If domain concepts are defined automatically, the concepts may be pulled from a defined corpus of text and automatically accepted as domain concepts for the probabilistic causal domain model.

Figure 2C:
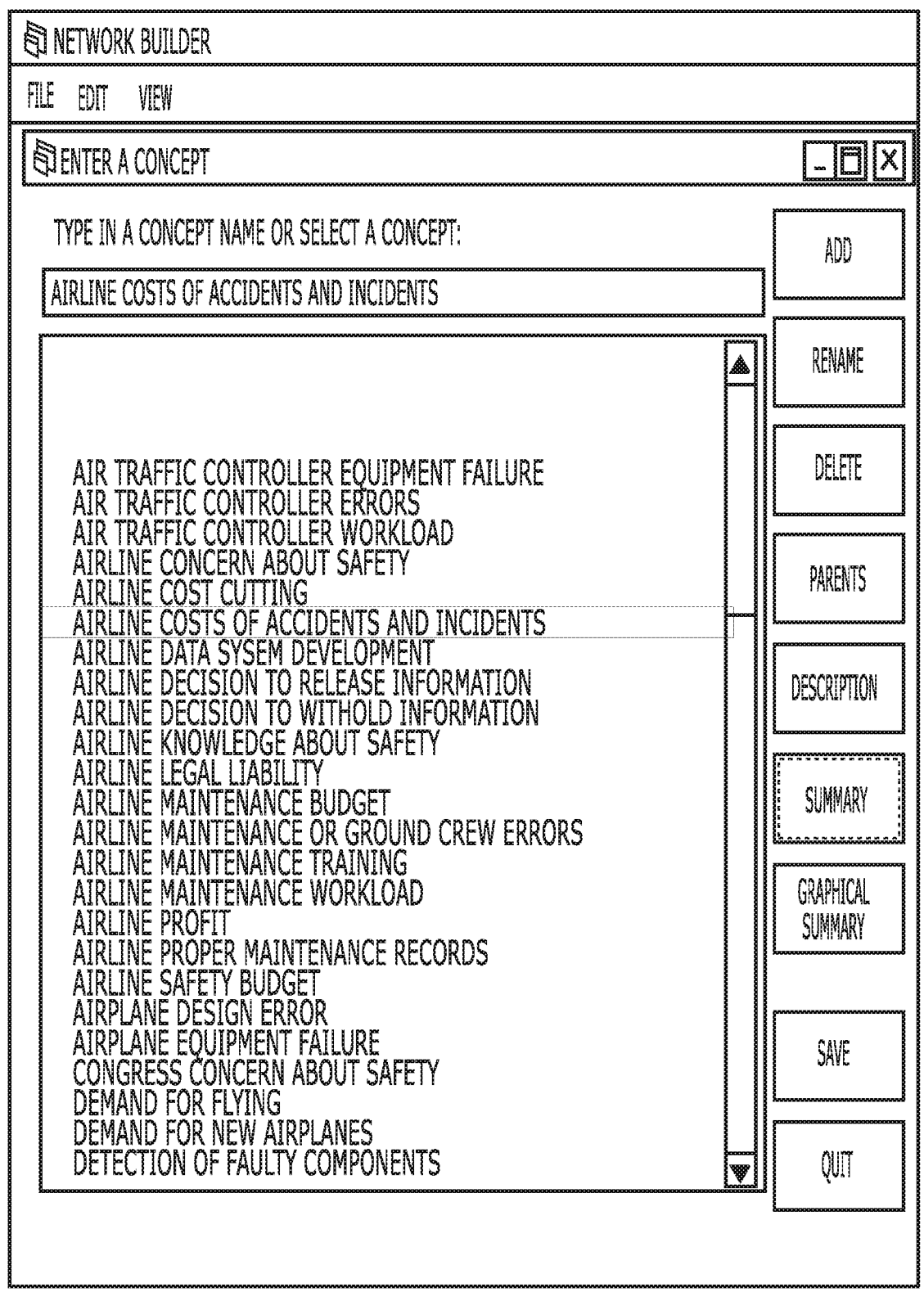
FIG. 2C is a pictorial representation of a graphical user interface for defining domain concepts for creating a probabilistic causal domain model.

Defining domain concepts may include defining a label for the domain concept. Typically, a label is a textual name for the domain concept, such as "Airline Maintenance Budget" and other domain concepts as shown in FIG. 2C. A label may also identify a discrete event. A domain concept may also be defined by attaching a text description to the concept that provides a precise definition of the concept. The description may be used to precisely define what the user or expert means by the label assigned to each concept. The description may also provide a source of new words, associated with each concept, which will be used in the search through the text document corpus. The text description may be described as an abbreviated explanation of the domain concept, such as the truncated description of the domain concept "Airline Costs of Accidents and Incidents" shown in FIG. 2D. A domain concept may also be defined by including related words that are associated with the domain concept, such as words, paragraphs, terms, concepts, phrases, compound phrases, key words, and key multi-word phrases. Similar to the description, these related words may be used in subsequent text searching and classification. For example, the domain concept Airline Costs of Accidents and Incidents may be further defined by including the related words "payments" and "accountable," as shown in FIG. 2D. Related words may be augmented either semi-automatically or automatically using retrieval from external sources, morphological and inflexional derivations of other related words, and text and/or reasoning processing of documents. Further details regarding text and reasoning processing are provided below with respect to FIGS. 3A and 3B and 6A and 6B. The more related words that are entered or augmented for a domain concept, the better a probabilistic causal domain model may be used to search, retrieve, process and evaluate text. External sources from which related words may be retrieved include a thesaurus, statistical Bayesian event classification keyword sets from training documents, and associated and/or related documents. A statistical Bayesian event classification keyword set is later described with regard to text processing in FIGS. 6A and 6B. Associated and/or related documents may be attached to a domain concept to provide further description and additional related words. The label, text description, related words, and associated and/or related documents are generally referred to as the textual parameters of domain concepts.

In addition to textual parameters, domain concepts may be further defined by quantitative and/or numerical values. A domain concept may be a state transitional quantity that can change positively or negatively to represent a positive or negative change in the occurrence of an event. State transition variables may also be referred to as representing "trends." For example, a domain concept may be further defined by dimensional units of state transitions. Additional quantitative and/or numerical values may be defined when building causal relationships between defined domain concepts, such as weighting and magnitudes described separately below. Similarly, additional quantitative and/or numerical values may be defined for a query, as described further below. For example, when creating a probabilistic causal domain model, parent and child dependencies or relationships between domain concepts typically are established. Causal relationships may be entered manually, semi-automatically, or automatically. For example, a domain expert may manually identify that one domain concept has a causal relationship with at least one other domain concept, such as how the domain concept Airline Costs of Accidents and Incidents is a parent concept to the concepts of "Airline Legal Liability" and "Occurrence of Aviation Accidents and Incidents" and a child concept to the concepts of "Airline Decision to Withhold Information" and "Airline Profit," as shown in FIG. 2D. When a domain concept is identified as a parent of another concept such that a parental setting is established, a child dependency may auto populate for the child concept to identify the child concept as being a child of the parent concept. Alternatively, or in addition, both parent and child settings may be accepted by manual input, thus providing for bidirectional auto population either from the parent or child dependency. In addition to establishing causal relationships, an embodiment of a system, method, or computer program for combining cognitive causal models with reasoning and text processing for knowledge driven decision support may accept causal relationship weight variances from negative 1 to 0 to positive 1, and all values in between. The range of negative 1 to 0 to positive 1 reflects the degree of belief in a causal relationship between two concepts, i.e., the probability of the causal relationship when the weight is 1. The weighting represents a subjective belief, such as where −1 represents a 100% belief of an inverse (negative) causal relationship, 0 represents no belief in a causal relationship and/or a belief of no direct or inverse causal relationship, and +1 represents a 100% belief of a direct (positive) causal relationship. For example, Airline Profit has a −0.3 causal relationship to Airline Costs of Accidents and Incidents. Thus, the −0.3 represents a 30% belief of an inverse causal relationship between Airline Costs of Accidents and Incidents, where the domain expert is making an educated guess that about 30% of the time there will be an observable negative relation between the two concepts. There is no strict numeric relationship between the two concepts as defined by the weighting. Rather, the weight of causal relationships may be entered by the domain expert to represent the domain expert's subjective belief of the probabilistic causal relationship between domain concepts.

Figure 2E:
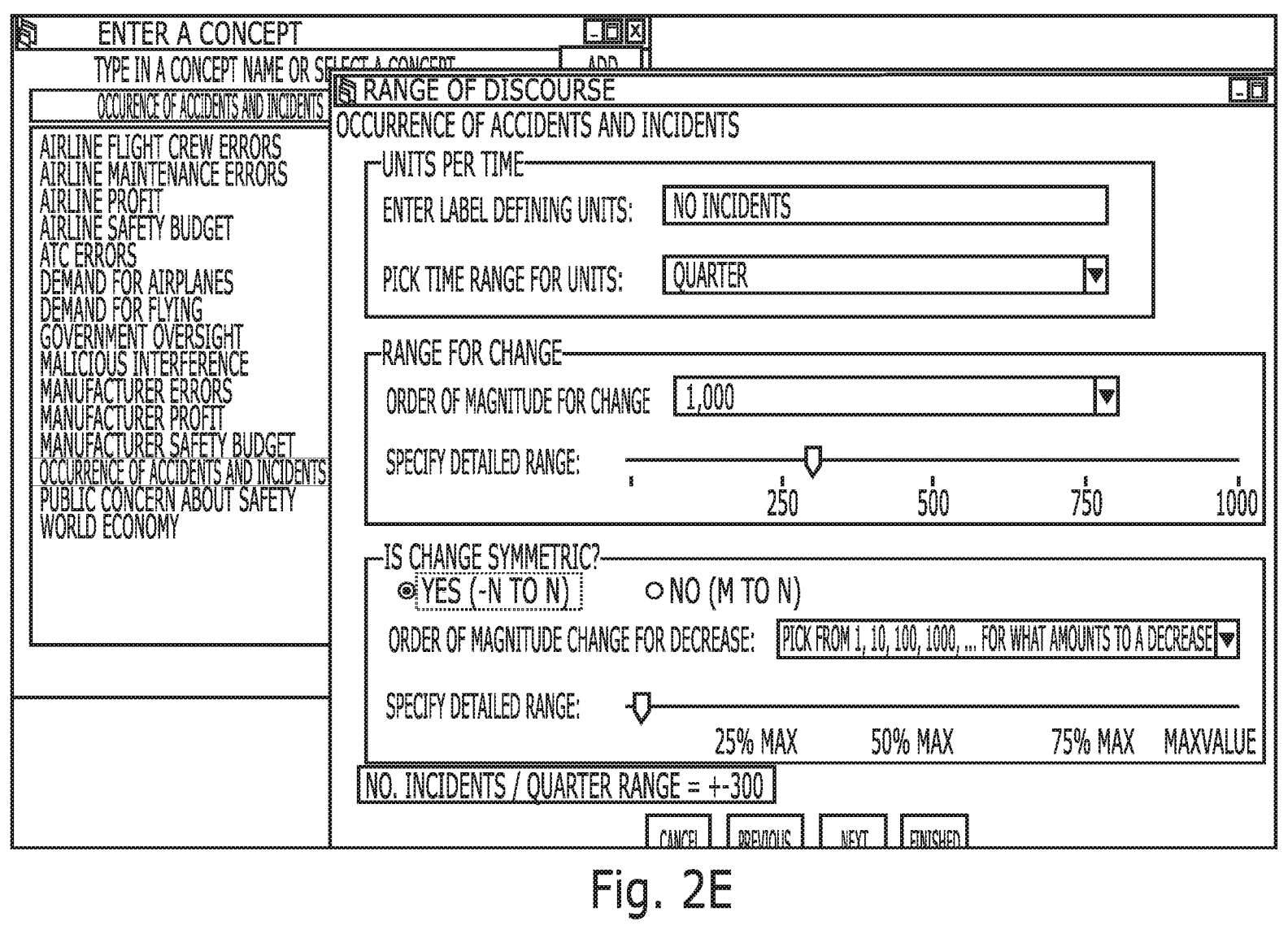

Further quantitative or numerical parameters of domain concepts may be used to establish a particular change or event occurrence. Such parameters may further define a domain concept, weights of causal relationships, and/or a query for use of the probabilistic causal domain model. For example, a domain expert or other user may add a numerical range representing the magnitude of the estimated or expected change for a domain concept in the defined units. As shown in the example of FIG. 2E, an order of magnitude for change of 1000 has been selected to permit the domain expert to specify on the sliding scale that an event of the domain concept Occurrence of Accidents and Incidents has a factor of approximately 290 of change with respect to relationships with other domain concepts, specifically child dependencies. A domain expert or user may define the estimated or expected time duration of relationships or the estimated time of a change or event. Typically these estimated or expected time durations represent the time lapse between a cause and effect. The graphical slider element is also a vehicle for the user to impart an intuitive belief without having to determine a precise number. By choosing the 1000 scale the user is also expressing the belief that the actual quantity is in the 3 orders of magnitude range. The system is aimed at eliciting educated guesses from one or more experts that know something about the domain, and who are documenting the knowledge qualitatively and quantitatively from their own memory and knowledge. So to come up with magnitudes off the top of their heads, the experts start with a rough estimate of the order of magnitude and then fine tune their intuition about that number using the sliding scale.

Using systems, methods, and computer programs for combining cognitive causal models with reasoning and text processing for knowledge driven decision support is a consistent, simple, and expedient way to allow a domain expert to create a probabilistic causal domain model. Systems, methods, and computer programs for combining cognitive causal models with reasoning and text processing for knowledge driven decision support allow for adjustability in changing parameters of the model and updating relationships and further defining domain concepts and grammar of the domain model, i.e., the language of the domain. One advantage of systems, methods, and computer programs for combining cognitive causal models with reasoning and text processing for knowledge driven decision support is the simplistic approach of allowing a domain expert to define the probabilistic causal domain model without needing to understand the reasoning methodology underlying the analytical tool that enables the performance of the analysis of information and predictions relevant to the domain. Using systems, methods, and computer programs for combining cognitive causal models with reasoning and text processing for knowledge driven decision support, a domain expert can offload bulk processing of text and articles and receive detection of alerts to events and trends. For example, once the probabilistic causal domain model has been constructed, it may be implemented in a particular domain to analyze documents and/or identify information within the documents, if any, related to the probabilistic causal domain model. The amount of text and number of documents that can be analyzed is limited merely by, for example, the rate at which documents and text therein can be acquired and the processing power of the processing circuitry of a computer system to perform text and reasoning algorithms upon the acquired text. The domain expert can later adjust textual, quantitative, and/or numerical parameters of the model.

By way of further explanation of systems, methods, and computer programs for combining cognitive causal models with reasoning and text processing for knowledge driven decision support, FIGS. 2C, 2D, 2E and 2F are an embodiment of the respectively defined concepts as used in the domain of airline safety. For example, the domain concepts, or more appropriately the labels of the domain concepts, visible in FIG. 2C relate to various intuitive categories associated with airline safety, and the description and related words in FIG. 2D relate to a particular airline domain concept, Airline Costs of Accidents and Incidents.

FIG. 2C is a pictorial representation of an example embodiment of a graphical user interface for defining domain concepts. The graphical user interface allows a domain expert to define domain concepts by defining labels for each concept name, such as Airline Costs of Accidents and incidents as highlighted in FIG. 2C. The graphical user interface provides the domain expert the ability to quickly select a concept and then to further define information about the concept, such as attaching a description or providing additional summary information such as related words, attached documents, and causal relationships between parent and child concepts, such as using buttons as those shown in FIG. 2C.

FIG. 2D is a pictorial representation of an example embodiment of a graphical user interface for providing a text description for defining causal relationships between domain concepts. A user might use the graphical user interface of FIG. 2D by selecting the Description button in the graphical user interface of FIG. 2C. The graphical user interface in FIG. 2D allows a domain expert to provide further information about a concept. For example, the description of the domain concept Airline Costs of Accidents and Incidents can be entered along with related words. In addition, causal relationships may be established between domain concepts by defining a domain concept as a parent or child of another domain concept, as well as the weighting there between as shown in parentheses.

FIG. 2E is a pictorial representation of an example embodiment of a graphical user interface for defining dimensional units of domain concepts. The graphical user interface allows a domain expert to define units for a concept. For example, in FIG. 2E the units per time and the range for units may be entered, such as the number of incidents per quarter for the domain concept Occurrence of Accidents and Incidents. Similarly, the range for change may be established by a magnitude of change and a detailed sliding scale. In addition, the domain expert may be able to establish whether or not a domain concept is symmetric. Additional quantitative and/or numeric information may be added in this or other embodiments of systems, methods, and computer programs for combining cognitive causal models with reasoning and text processing for knowledge driven decision support.

Figure 2F:
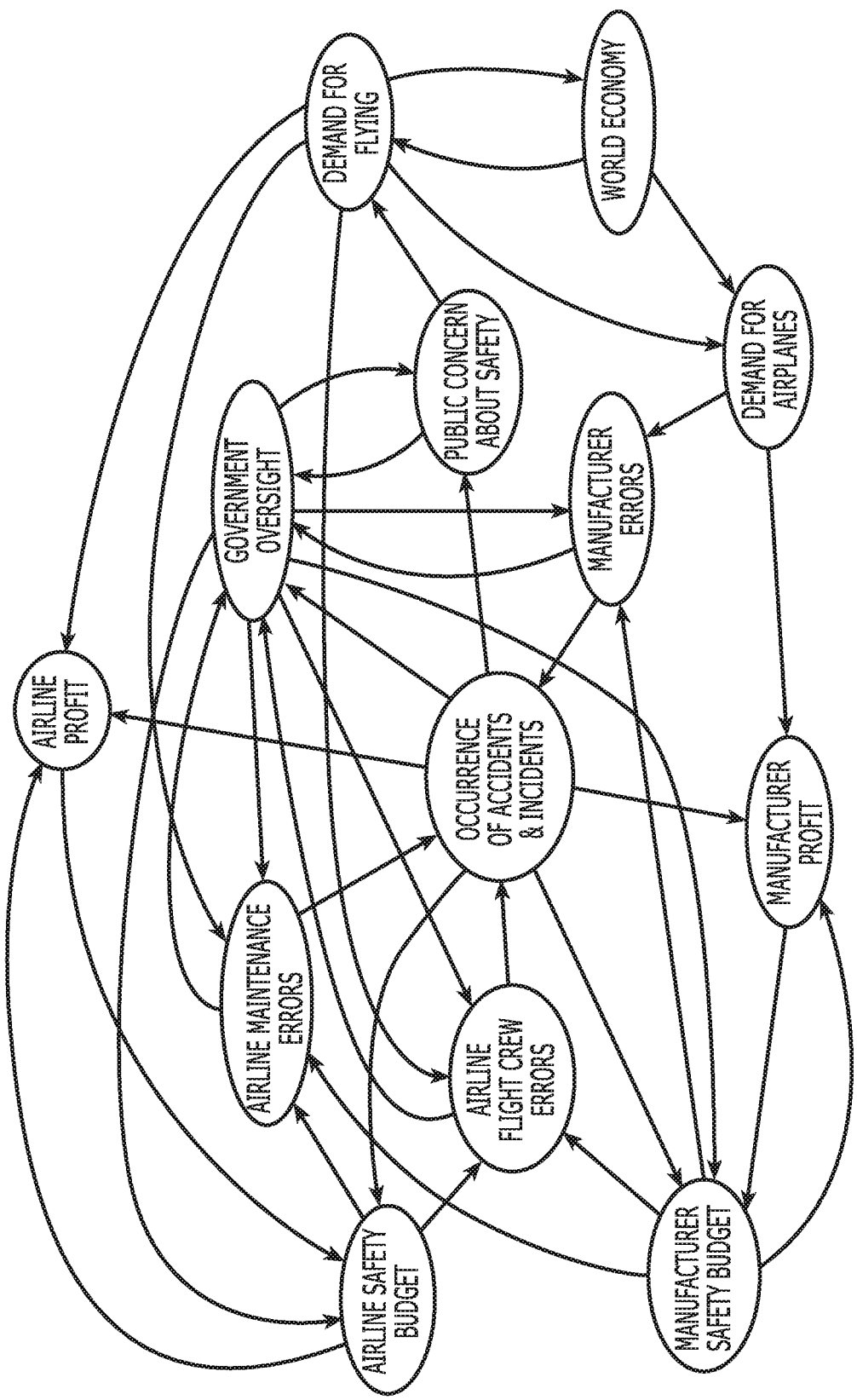
FIG. 2F is a pictorial representation of an unconstrained probabilistic causal domain model.

FIG. 2E is a pictorial representation of a directed graph of an unconstrained probabilistic causal domain model, or at least a fragment thereof. The directed graph in FIG. 2E has cycles or connections that circle back from one node to the original node. Nodes are connected based on causal relationships, and the casual relationships may represent positive and negative casual dependences of the connection. For example, the "Manufacturer Safety Budget" concept node relates to the "Manufacturer Errors" concept node with an inverse causal relationship as noted by the (−) sign associated with the arc. The causal relationships and weightings between nodes of FIG. 2F are established from parent and child relationships of a domain mode, such as defined by a domain expert using the graphical user interfaces of FIGS. 2C, 2D, and 2E.

Figure 3A:
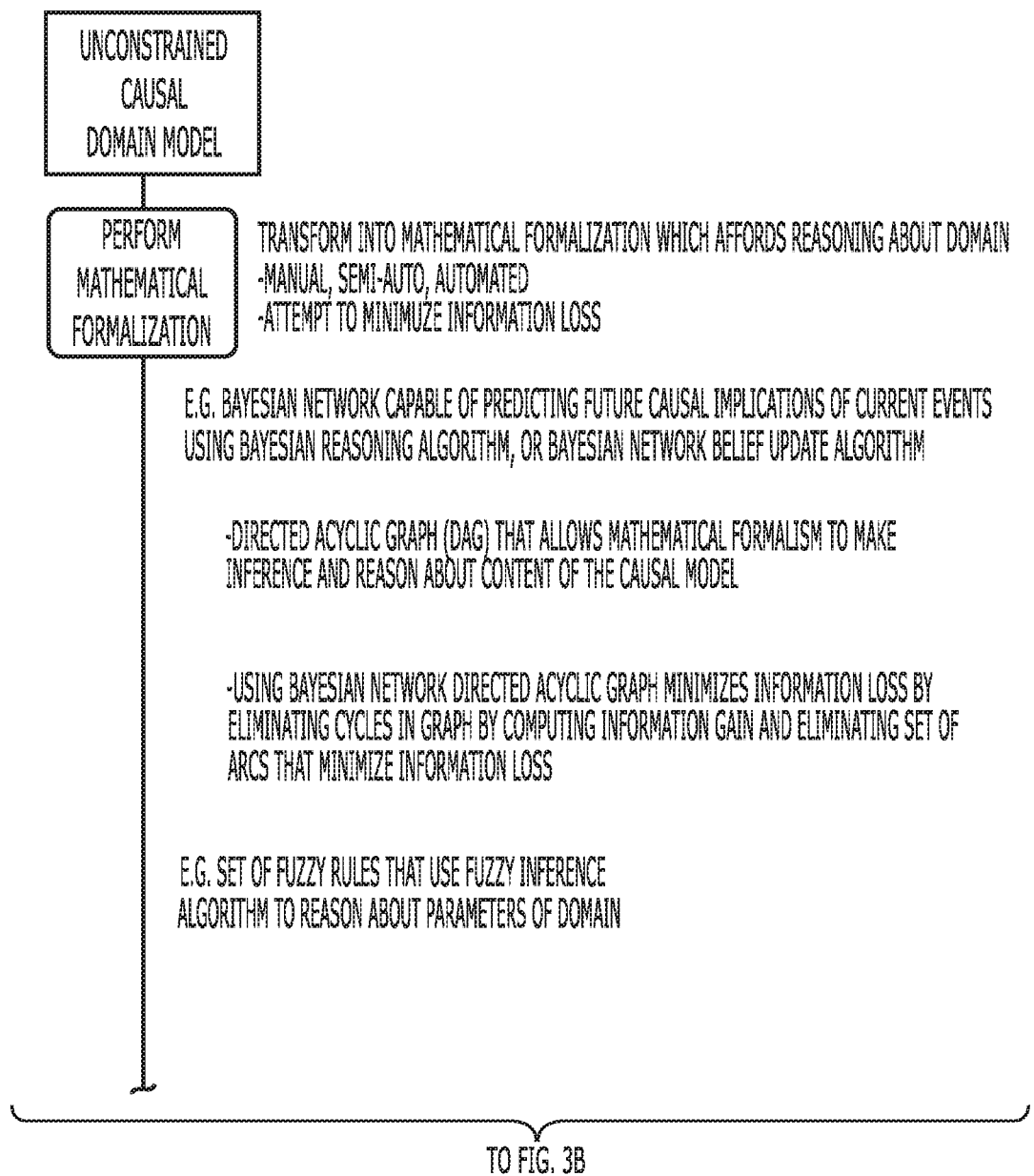
FIGS. 3A and 3B are diagrams of reasoning processing.
Figure 3B:
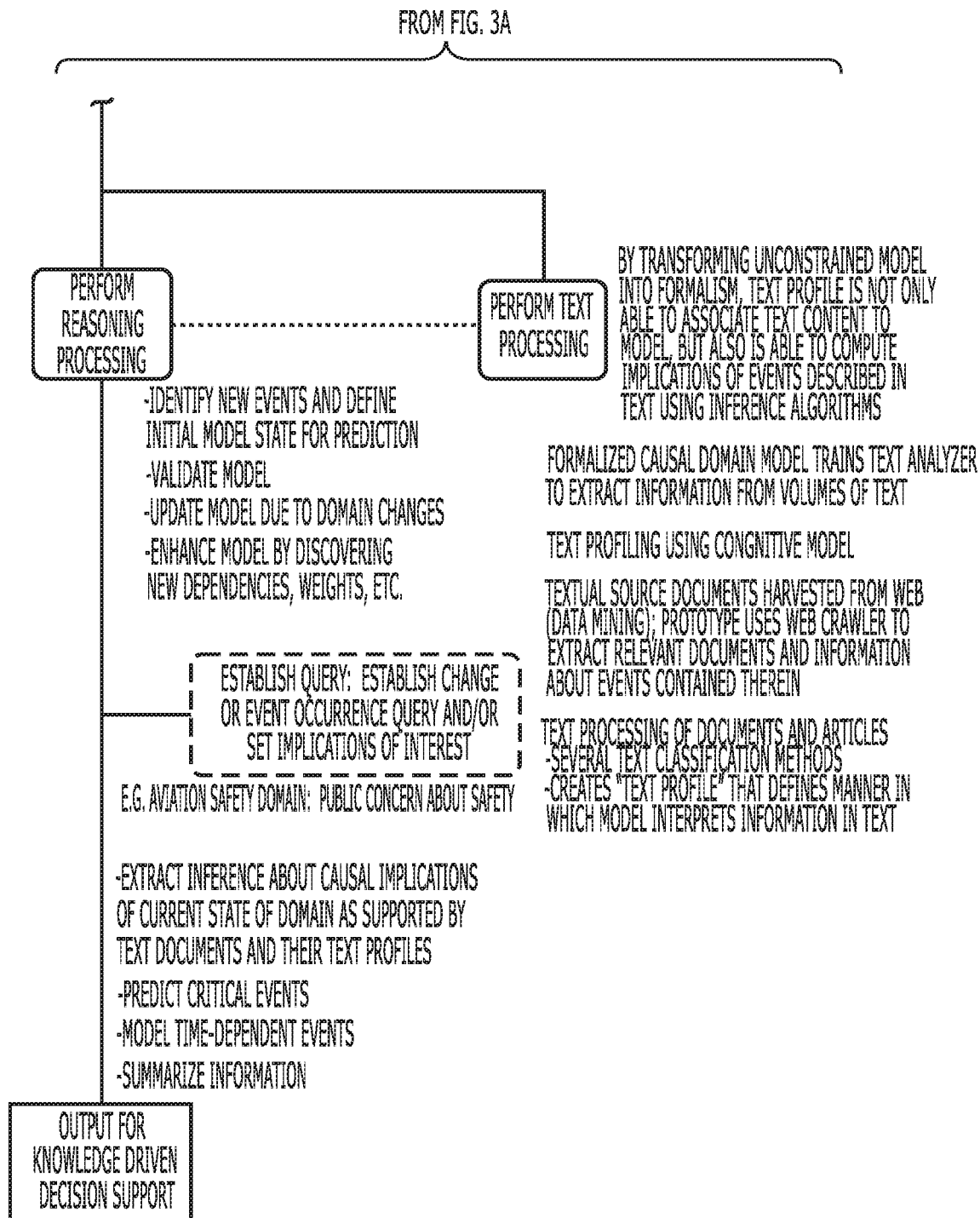

B. Mathematical Formalization of Probabilistic Causal Domain Model, Text Processing, and Reasoning Processing FIGS. 3A and 3B are diagrams of reasoning processing. As previously discussed, certain aspects of combining cognitive causal models with reasoning and text processing for knowledge driven decision support are not independent of other various aspects of knowledge driven decision support, such as how the embodiment of reasoning processing shown in FIGS. 3A and 3B incorporates or draws upon the concept of performing text processing and having previously defined a probabilistic causal domain model. Similarly, the reasoning processing in FIGS. 3A and 3B uses the unconstrained probabilistic causal domain model created by a domain expert as described above. Thus, various aspects of systems, methods, and computer programs for combining cognitive causal models with reasoning and text processing for knowledge driven decision support are intertwined and related, such as shown in FIG. 1.

1. Mathematical Formalization of Probabilistic Causal Domain Model

Figure 3C:
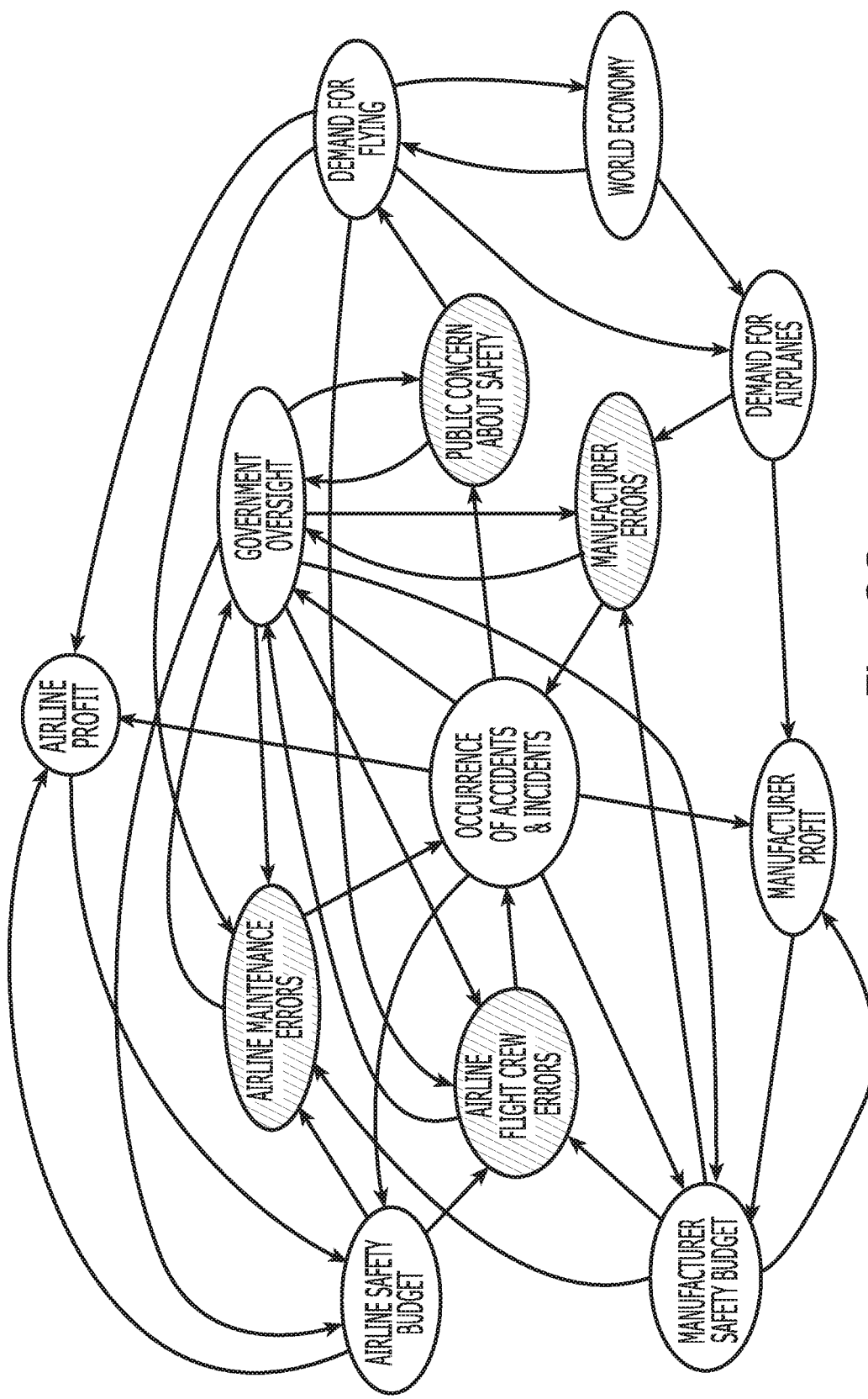
FIG. 3C is a pictorial representation of a focused unconstrained probabilistic causal domain model.

The creation of a probabilistic causal domain model by a domain expert results in an unconstrained causal domain model, which is a directed graph with cycles as shown in the example of FIG. 3C. In a directed graph with cycles of the unconstrained causal domain model, nodes of the graph represent domain concepts. The nodes are connected by influence arcs which may be causal or probabilistic in nature. And arcs of the graph represent weights of believed causal relationships between the nodes.

Prior to performing reasoning algorithms, the unconstrained causal domain model is converted from an unconstrained causal domain model into a formalization by performing mathematical formalization on the unconstrained causal domain model. The mathematical formalization may be performed manually, semi-automatically, or automatically. By transforming the unconstrained causal domain model into a mathematical formalization, the formalized model can support processing of the domain using mathematical reasoning algorithms. When converting the unconstrained causal model to a formalization, minimizing information loss may aid in retaining the causal domain model as intended by the domain expert. Based on information input by a domain expert or user creating an unconstrained causal domain model, different causal domain models can be constructed to formalize the domain concepts and causal relationships between domain concepts. For example, a formalized domain model may be constructed utilizing model-based reasoning, case-based reasoning, Bayesian networks, neural networks, fuzzy logic, expert systems, and like inference algorithms. An inference algorithm generally refers to an algorithm or engine of one or more algorithms configured to use data and/or information and converting the data and/or information into some form of useful knowledge. Different inference algorithms perform the conversion of data and/or information differently, such as how a rule-based inference algorithm may use the propagation of mathematical logic to derive an output and how a probabilistic inference algorithm may look for linear correlations in the data and/or information for a predictive output. Many inference algorithms incorporate elements of predictive analysis, which refers to the prediction of a solution, outcome, or event involving some degree of uncertainty in the inference; predictive analysis typically refers to a prediction of what is going to happen but, alternatively or in addition, may refer to a prediction of when something might happen. Different types of inference algorithms, as mentioned above, may be used with embodiments of systems, methods, and computer programs for combining cognitive causal models with reasoning and text processing for knowledge driven decision support. Since Bayesian networks can accept reliability (prior) data as well as information from other sources, such as external information from a knowledge base, and can compute posterior probabilities for prioritizing domain concepts, a formalized probabilistic causal domain model of one advantageous embodiment is constructed based upon a Bayesian network that is capable of being updated. A number of software packages are commercially available for building models of a Bayesian network. These commercially available software packages include NETICA™ from Norsys Software Corporation of Vancouver, British Columbia, and HUGIN from Hugin Expert A/S of Denmark. Another popular open source software package is GeNIe of the University of Pittsburgh. As provided by these software packages, a processing portion of a computer system may advantageously include a software package that includes noisy max equations for building the Bayesian network that will form the formalized probabilistic causal domain model.

While any model building approach can be used, several model building approaches for Bayesian networks are described by M. Henrion, *Practical Issues in Constructing a Bayes' Belief Network*, Uncertainty in Artificial Intelligence, Vol. 3, pp. 132-139 (1988), and H. Wang et al., *User Interface Tools for Navigation in Conditional Probability Tables and Graphical Elicitation of Probabilities in Bayesian Networks*, Proceedings of the Sixteenth Annual Conference on Uncertainty and Artificial Intelligence (2000).

The construction of a Bayesian network requires the creation of nodes with collectively exhaustive, mutually exclusive discrete states, and influence arcs connecting the nodes in instances in which a relationship exists between the nodes, such as in instances in which the state of a first node, e.g., the parent node, effects the state of a second node, e.g., the child node. In a Bayesian network, a probability is associated with each state of a child node, that is, a node that is dependent upon another node. In this regard, the probability of each state of a child node is conditioned upon the respective probability associated with each state of each parent node that relates to the child node. It is noted, however, that the propagation of uncertainty in a Bayesian network is bi-directional. Consequently evidence for a child node can also trigger the propagation of uncertainty to predict the probabilistic state of a parent. Because of this bi-directional property of Bayesian networks, inferences can be performed in both in the forward direction (predictive analysis) and the backward direction (root-cause analysis). In the forward direction, the inference predicts what the consequence of evidence found or assumptions made in a node is for any node downstream. In turn, in the backward direction, an analysis may be performed of what may be the probable causes that can explain evidence found or assumptions made for a node on the upstream (or parent) nodes. For purposes of illustration but not of limitation, a predictive analysis will be generally discussed hereinafter.

An example formalized domain model is a directed acyclic graph (DAG) Bayesian network configured to predict future causal implications of current events that can then use a Bayesian reasoning algorithm, or Bayesian network belief update algorithm, to make inferences from and reason about the content of the causal model to evaluate text. By using a Bayesian network directed acyclic graph, the transformation from an unconstrained causal model minimizes the information loss by eliminating cycles in the unconstrained graph by computing information gained and eliminating the set of arcs that minimize the information lost to remove the cycles and create the direct acyclic graph. Another example of a formalized domain model is a set of fuzzy rules that use fuzzy inference algorithms to reason about the parameters of the domain.

The nodes of a Bayesian network include either, or both, probabilistic or deterministic nodes representative of the state transition and discrete event domain concepts. Typically, the nodes representative of domain concepts are interconnected, either directly or through at least one intermediate node via influence arcs. The arcs interconnecting nodes represent the causal relationships between domain concepts. For example, FIGS. 3E and 3F show representative concept nodes related to the public concern about airline safety where nodes are interconnected, directly and through at least one intermediate node via influence arcs. Based on interconnections of concept nodes, intermediate nodes may interconnect at least two domain concept nodes in an acyclic manner. Bayesian networks do not function if a feedback loop or cycle exists.

Each node of a network has a list of collectively exhaustive, mutually exclusive states. If the states are normally continuous, they must be discretized before being implemented in the network. For example, a concept node may have at least two states, e.g., true and false. Other nodes, however, can include states that are defined by some quantitative and/or numerical information. For example, Airline Profit may contain six mutually exclusive and exhaustive states, namely, strong profits, moderate profits, weak profits, no profit, losing profits, and bankrupt. Alternatively, Airline Profit may contain a defined range of states, such as from positive one hundred million to negative one hundred million. A probability, typically defined by a domain expert, may be assigned to each state of each node. A probability may be obtained from or related to another node or nodes. For example, as shown in FIGS. 3E and 3F, the probability of Occurrence of Accidents and Incidents may be exclusively based on or derived in part from such domain concepts as Airline Flight Crew Errors, Manufacturer Errors, and Airline Maintenance Errors, where the interconnecting arcs there between and influence of probabilities are based upon their respective causal relationships and weightings.

Figure 3D:
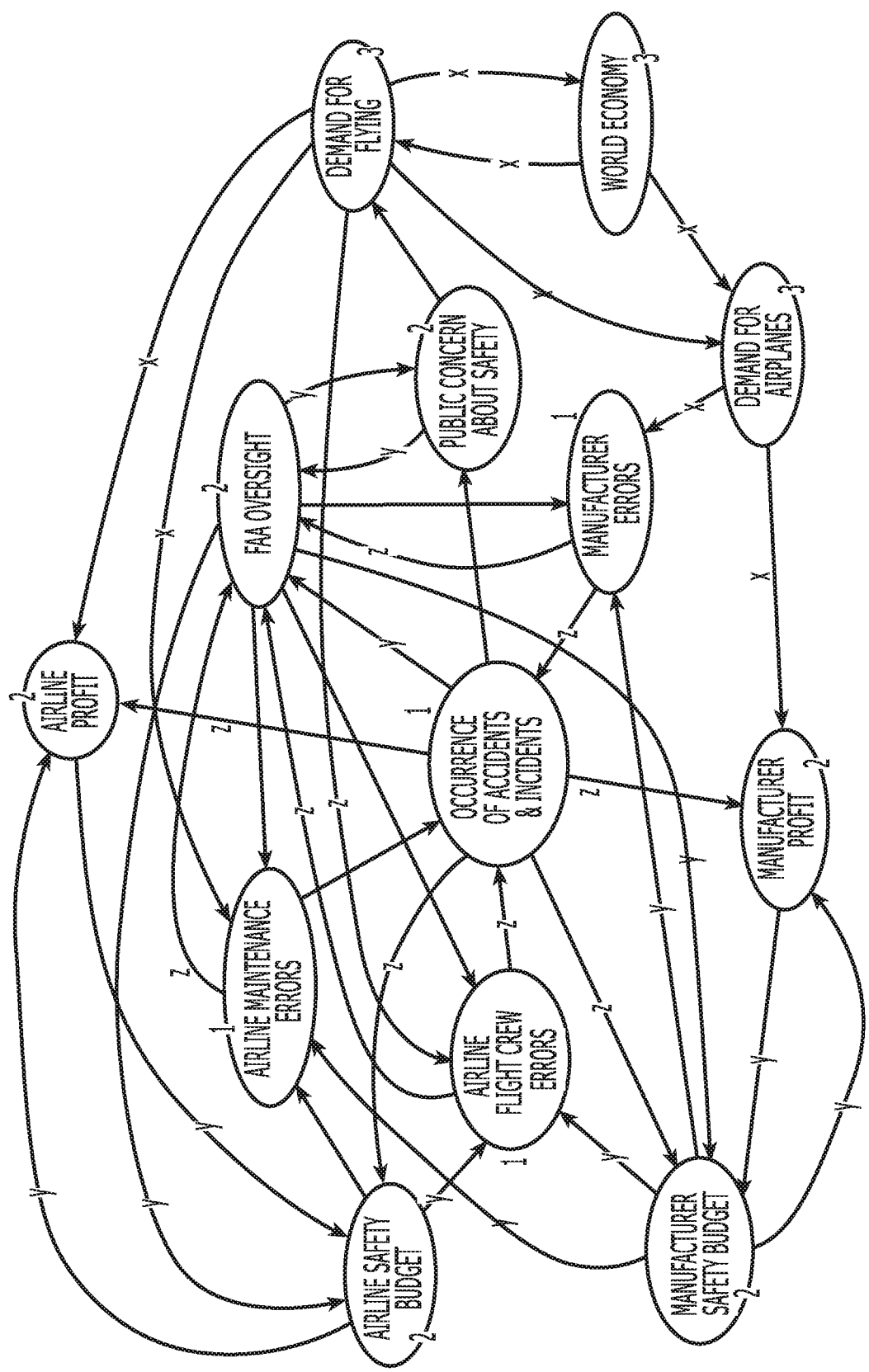
FIG. 3D is a pictorial representation of a processed, focused, unconstrained probabilistic causal domain model.
Figure 3E:
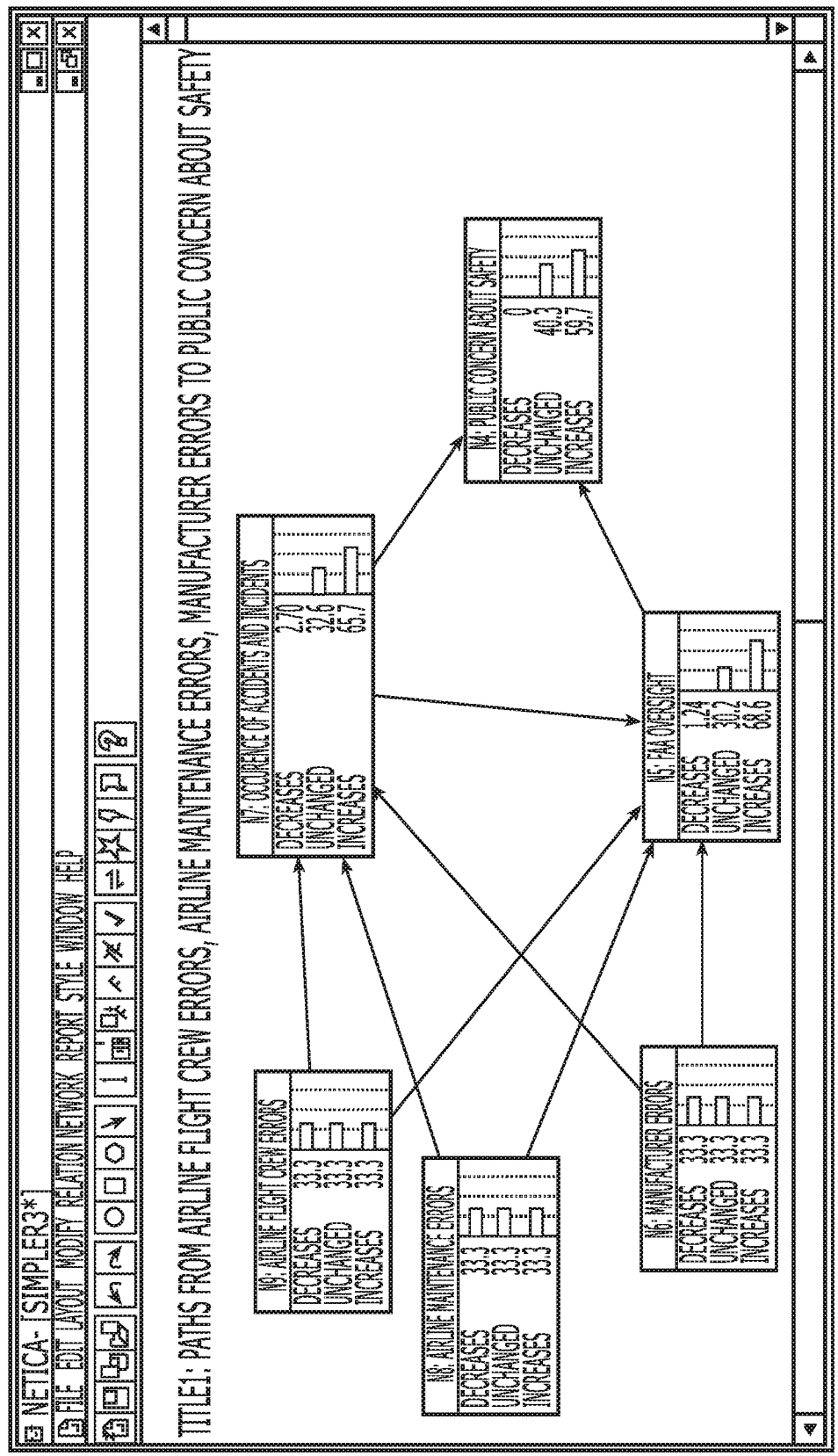
FIG. 3E is a pictorial representation of a graphical user interface for representing a formalization of a processed, focused, unconstrained probabilistic causal domain model.
Figure 3F:
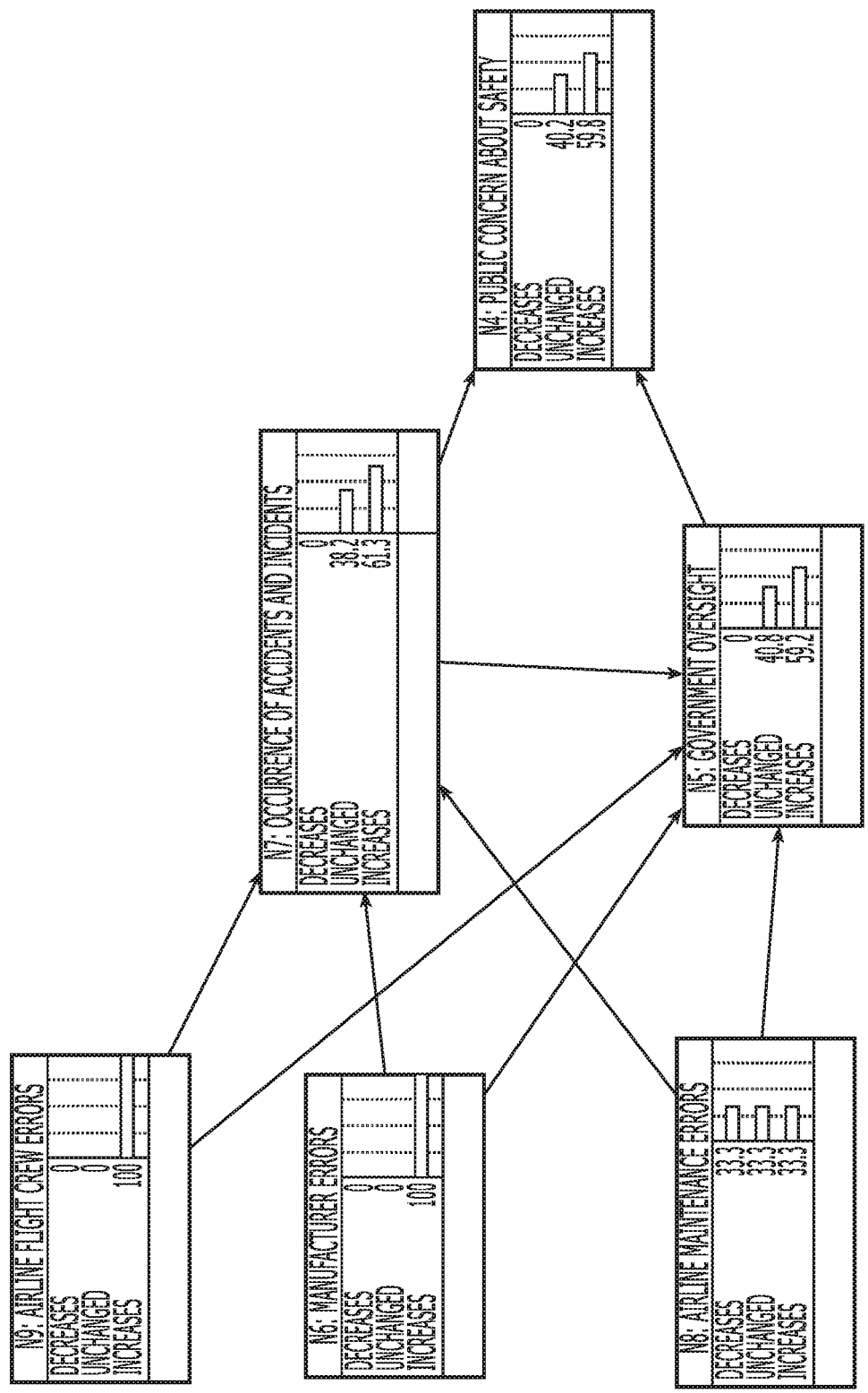
FIG. 3F is a pictorial representation of a graphical user interface for representing a formalization of another processed, focused, unconstrained probabilistic causal domain model.

FIGS. 3C, 3D, 3E and 3F provide examples of a formalization of an unconstrained causal domain model as described above. FIG. 3C is a pictorial representation of a focused unconstrained causal domain model which is a result of an embodiment of a system, method, and/or computer program for combining cognitive causal models with reasoning and text processing for knowledge driven decision support where a domain expert has predicted the probability, magnitude, and time of a target domain concept change due to changes in other source concepts. For example, the domain expert has selected Airline Maintenance Errors as a source concept and Occurrence of Accidents and Incidents as a target concept. Further source concepts for the target concept Occurrence of Accidents and Incidents also include Airline Flight Crew Errors and Manufacturer Errors. Source and target concepts are not the same as parent and child concepts, but are beginning and ending concepts for a query of set of implications of interest. However, underlying source and target concepts are at least one parent and child concept pairing and at least one causal relationship between the parent and child concepts. The source and target concepts and related predictions of probability, magnitude, and time of the target concept change due to changes in other source concepts focus the causal domain model with respect to the Public Concern about Safety Domain concept. For example, the relationship between the domain concepts Government Oversight and Airline Maintenance Errors may strengthen over time if the government determines that Airline Maintenance Errors are an increasing cause of airline accidents or incidents. In such a case, the causal relationship may shift from zero, representing no influence, to +0.75, representing a subjective believed strength of direct influence between the domain concepts. These causal relationships may be further defined as shown in FIG. 3D, which is a pictorial representation of a graphical user interface for representing a formalization of a processed focused unconstrained causal domain model of a system, method, and/or computer program for combining cognitive causal models with reasoning and text processing for knowledge driven decision support. FIG. 3C shows where the domain expert or user may have identified particular domain concepts of importance, i.e., Airline Maintenance Errors, Airline Flight Crew Errors, and Manufacturer Errors, and a target domain concept, i.e., Public Concern About Safety, that relates to a particular query, e.g., the probability of change of public concern about safety in the current state of the airline industry domain. FIG. 3D represents an intermediate transformation of the focused unconstrained causal domain model of FIG. 3C. FIG. 3D shows how mathematical formalization may compute values for information obtained by causal relationships and importance of particular domain concepts, such as how influence arcs have been valued or categorized as x, y, or z and domain concepts valued by 1, 2, or 3. Levels of categorization is an example of one method for formalizing domain models. For example, during mathematical formalization, values of relative importance of the concepts may be calculated, such as 1 being most important and 3 being less important as shown in FIG. 3D. Similarly, during mathematical formalization, values or categorization of importance of the relationship arcs between concepts may be calculated, such as z being necessary, y being optional, and x being unnecessary as shown in FIG. 3D. Formalization typically takes into account the computation of information gained and minimization of information loss where arcs can be removed from the cyclical graph as represented in FIGS. 3E and 3F. FIGS. 3E and 3F involve the same concepts and directed relationships, however the numerical parameters of the domain concepts and weight of relationships are different between the two, representing different probabilistic causal domain models, or at least different versions of a probabilistic causal domain model. However, different causal domain models, such the causal domain models expressed in FIGS. 3E and 3F, may result in similar outcomes, as described further below. FIG. 3E is a pictorial representation of a graphical user interface for representing a formalization of a processed focused unconstrained causal domain model. FIG. 3F is a pictorial representation of a graphical user interface for representing a formalization of a processed focused unconstrained causal domain model and resulting graph of initial domain model state. The embodiment in FIG. 3F shows the NETICA™ product from Norsys Software Corporation of Vancouver, British Columbia, which is an off-the-shelf system for building Bayesian networks and updating their beliefs, although it should be appreciated that other Bayesian inference engines may be used instead of NETICA™. In both FIGS. 3E and 3F, the directed relationships from the Public Concern About Safety to the source concepts of Airline Flight Crew Errors, Airline Maintenance Errors, and Manufacturers Errors and intermediate source concepts Occurrence of Accidents and Incidents and Government Oversights have been removed such that the causal relationships remaining after the transformation from an unconstrained probabilistic causal domain model to a mathematical formalization result in acyclic graphs that flow from source concepts to target concepts and intermediate source concepts to the final target concept, Public Concern About Safety. The directed causal relationships or influence arcs between target and source concepts of FIGS. 3E and 3F may influence probabilistic or deterministic values of source concepts. For example, FIGS. 3E and 3F, involving the same concepts and directed relationships but with different numerical parameters of the domain concepts and weight of relationships, arrive at different probabilistic results for Public Concern About Safety. However, it may also be useful to note that the domain models of FIGS. 3E and 3F result in different intermediate domain concept probabilities but arrive at similar resultant target concept probabilities. This may not be intended, but reflects that, just as two domain experts may interpret a situation differently and, therefore, create different domain models, systems, methods, and computer programs for combining cognitive causal models with reasoning and text processing for knowledge driven decision support provide the versatility of accepting different models to evaluate the same or similar domains, and may, as in FIGS. 3E and 3F, arrive at similar results, just as two domain experts may have done without the assistance of a system, method, and/or computer program for combining cognitive causal models with reasoning and text processing for knowledge driven decision support. However, by using a system, method, and/or computer program for combining cognitive causal models with reasoning and text processing for knowledge driven decision support the domain experts may arrive at these results much faster and may be able to analyze much larger quantities of information, thereby decreasing the chance that important information may not be analyze or that results may be incomplete or incorrect due to limited information.

2. Transformation of a Probabilistic Causal Domain Model to a Query Specific Bayesian Network By way of another example, an unconstrained domain model may be transformed, in response to a query, into a query specific Bayesian network, such as a query specific continuous time Bayesian network. As shown in block 50 of FIG. 4 and as described above in conjunction with FIG. 2F and FIGS. 3C-3F, an unconstrained domain model is provided as defined by domain concepts and probabilistic causal relationships between the domain concepts. Each probabilistic causal relationship includes a value for the weight of causal belief for the probabilistic causal relationship. By way of another example, FIG. 5A depicts an unconstrained domain model with three domain concepts labeled as Government Oversight, Occurrence of Accidents and Public Concern and probabilistic causal relationships between the three domain concepts as represented by the arrows extending between the domain concepts. Additionally, the unconstrained domain model of FIG. 5A includes weights associated with the probabilistic causal relationships indicating the impact of one domain concept upon another domain concept.

An unconstrained domain model allows all connections and permits all cycles. Each probabilistic causal relationship is associated with a weight w which is, in an example embodiment, a number between −1 and 1. The closer |w| is to 1, the stronger the influence of the parent domain concept over the child domain concept and the closer |w| is to 0, the weaker the influence. In an example embodiment, if the weight is positive, a high value associated with the parent domain concept makes a high value associated with the child domain concept more likely and a low value associated with the parent domain concept makes a low value associated with the child domain concept more likely. In this example embodiment, a negative weight inverts the influence so that a high parent value makes low child values more likely and a low parent value makes high child values more likely. Additionally, a moderate parent value makes a moderate child value more likely.

Figure 4:
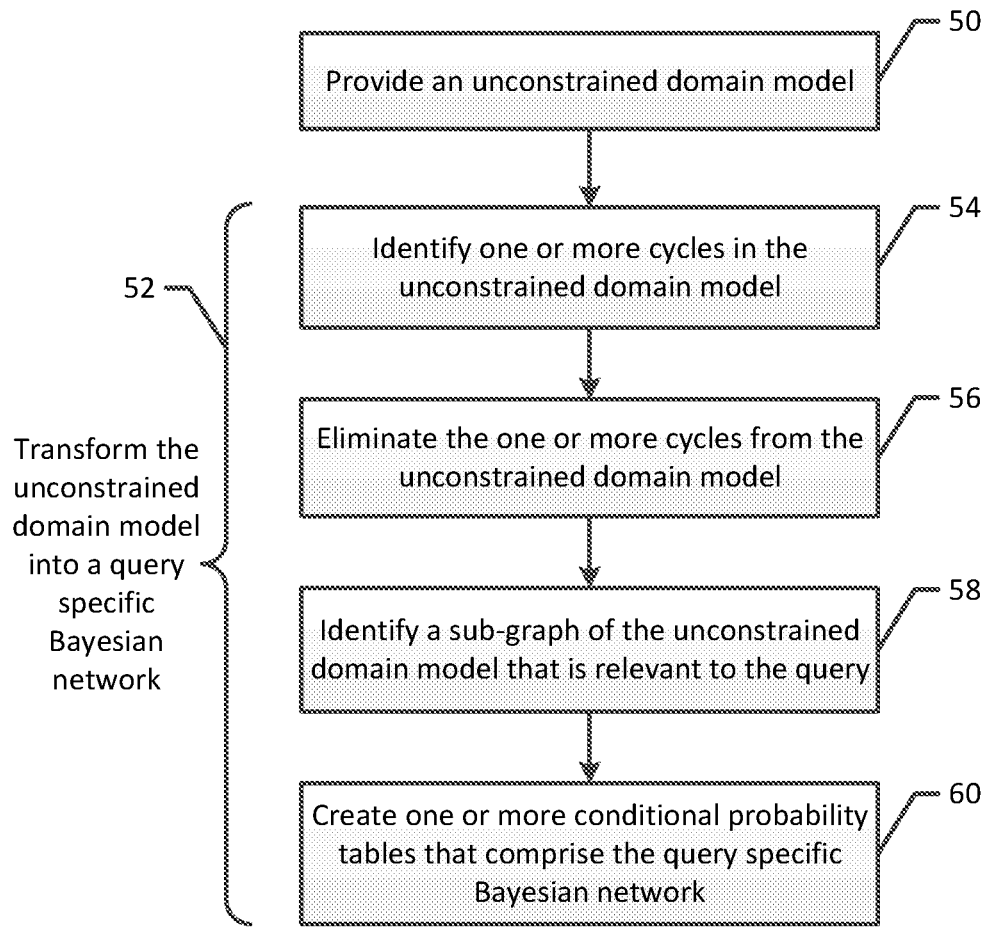
FIG. 4 is a flowchart of the operations performed, such as by processing circuitry, in accordance with an example embodiment of the present disclosure.
Figure 5A:
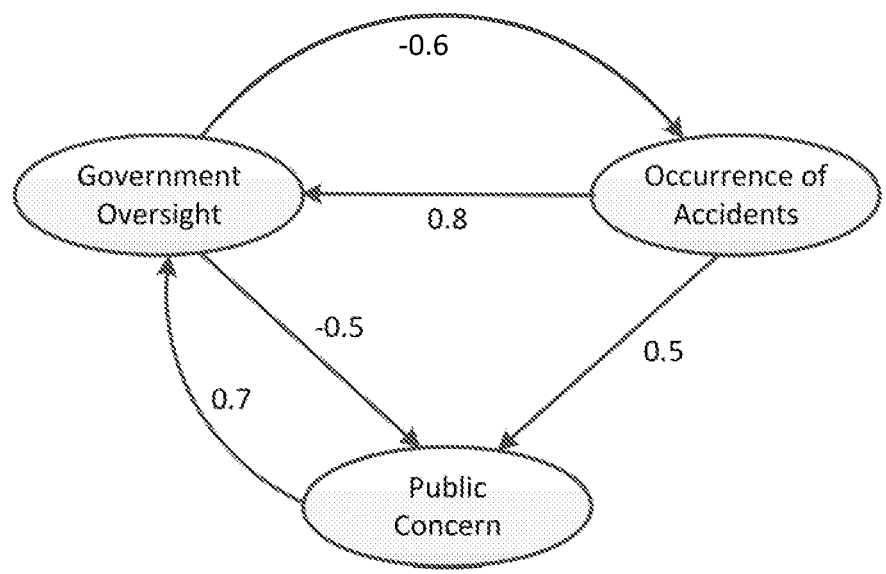
FIG. 5A is an example of an unconstrained domain model that may be transformed to a query specific Bayesian network in accordance with an example embodiment of the present disclosure.

As illustrated by the blocks collectively defined as 52 in FIG. 4, the computer system, such as the processing circuitry, is also configured to transform the unconstrained domain model in response to a query. In this regard, the query may be generated by a user or by another computing device and received by the computer system, such as the processing circuitry. The query may be formulated in various manners, but may indicate one or more domain concepts that are of interest and/or one or more probabilistic causal relationships between respective domain concepts that are of interest. For example, the query may define a set of observation variables and one or more target variables with each variable being a domain concept in the unconstrained domain model. By way of a more particular example, queries may include: What is the probability that Public Concern will increase given that Occurrence of Accidents is on the rise and assuming decreased Government Oversight? and What is the probability that decreased Government Oversight is the cause of an observed increase in Occurrence of Accidents? In this regard, the computer system, such as the processing circuitry, is configured to transform the unconstrained domain model into a query specific Bayesian network for the domain model. By transforming the unconstrained domain model into a query specific Bayesian network in an efficient and accurate manner, the resulting Bayesian network may be readily utilized, such as for strategic decision support including reasoning analysis by assessing a hypothesis or responding to a query with a probabilistic and temporal prediction of a future event.

As also shown in FIG. 4, the transformation of the unconstrained domain model into a query specific Bayesian network includes the identification, by the computer system, such as the processing circuitry, of one or more cycles in the unconstrained domain model. In this regard, a cycle is defined as a sequence of nodes in the unconstrained model that start and end with the same node and where any of the intermediate (or in between) nodes are traversed at least twice. See block 54 of FIG. 4. See, for example, an article entitled "Finding all the elementary circuits in a directed graph" by B. Johnson in the SIAM Journal of Computing, 4(1) (1975) and an article entitled "Enumeration of the elementary circuits of a directed graph" by R. E. Tarjan in the SIAM Journal of Computing, 2:211-216 (1973). With respect to the example of FIG. 5A, one cycle is identified between the Government Oversight and Occurrence of Accidents domain concepts, while another cycle is identified between the Government Oversight and the Public Concern domain concepts.

As shown in block 56 of FIG. 4, the computer system, such as the processing circuitry, is also configured to eliminate one or more cycles from the unconstrained domain model. In an example embodiment, the computer system, such as the processing circuitry, is configured to identify all cycles in the unconstrained domain model and to thereafter eliminate all cycles from the unconstrained domain model. In an example embodiment, the cycles are eliminated in a manner to reduce or minimize the information loss, such as by removing edges with minimal information loss that eliminate all cycles in the unconstrained model, resulting in a Bayesian network.

In regards to the elimination of the cycles, the computer system, such as the processing circuitry, of an example embodiment is configured to identify the causal relationships between the domain concepts that comprise the cycle. Of those causal relationships between the domain concepts, the computer system, such as the processing circuitry, of this example embodiment is configured to identify the causal relationships that are weak. In this regard, the computer system, such as the processing circuitry, determines a causal relationship in the unconstrained model to be weak relative to the strength of other edges in the same model. Thus, the edges having the lowest weights, such as the lowest absolute values, or weights having an absolute value that fall below a predefined threshold, such as the weights that are in lowest quartile or half of the weights of the model may be considered weak in some embodiments. In the context of a cycle, the edge(s) having the lowest absolute values are considered weak relative to the other edges that comprise the cycle. In FIG. 5A, for example, the edges having weights of 0.5 and −0.5 are considered to be weak as these edges have the lowest weights such that to break the cycle between Government Oversight and Public Concern, the edge having a weight of −0.5 may be eliminated. The computer system, such as the processing circuitry, of this example embodiment is then configured to remove the causal relationships between the domain concepts that form a cycle that are identified to be weak. Following the removal of the causal relationships between the domain concepts that were identified to be weak, the cycles have been eliminated while reducing, such as minimizing, the information loss as a result of the removal of the weak causal relationship(s).

As shown in block 58 of FIG. 4, the computer system, such as the processing circuitry, is also configured to identify a sub-graph of the unconstrained domain model that is relevant to the query. In this regard, the computer system, such as the processing circuitry, is configured to identify the sub-graph of the unconstrained domain model by pruning domain concepts that are irrelevant to the query and correspondingly identifying the domain concepts that are relevant to the query. As such, the sub-graph of the unconstrained domain model only includes those domain concepts and the probabilistic causal relationships that extend between those domain concepts that are relevant to the query and not the domain concepts and the associated probabilistic causal relationships that are irrelevant to the query. The domain concepts that are relevant to the query may be distinguished from those that are irrelevant to the query in various manners including by examination of the query itself. For example, the domain concepts that are identified or mentioned by the query as the observation and target variables are generally considered relevant, while the domain concepts that are not identified or otherwise mentioned by the query are generally considered irrelevant. In the context of a Bayesian network, the structure and the parameters of the Bayesian network capture the joint probability distribution between a collection of variables. Implicit in the structure, for any specific query about a particular variable, the Bayesian network provides for a determination, using mutual information calculations, which of the other variables are dependent or independent of the particular variable (and therefore relevant or irrelevant, respectively, to the query) given a set of evidence, that is, a set of known variables. See, for example, an article entitled "Identifying Independence in Bayesian Networks" by Geiger, et al. in Networks 20:507-534 (1990).

The computer system, such as the processing circuitry, of an example embodiment also is configured to create one or more conditional probability tables that comprise the query specific Bayesian network. See block 60 of FIG. 4. As the conditional probability tables that are created depend upon the probabilistic causal relationships between domain concepts, the conditional probability tables that are created depend, at least in part, upon whether a domain concept has a parent domain concept or not and, in an instance in which a child domain concept has a parent domain concept, the number of parent domain concepts and the weight associated with the probabilistic causal relationships extending between each parent domain concept and the child domain concept.

In an embodiment in which a child domain concept has no parent domain concepts, the probability P of the child domain concept X has a uniform distribution:

$$P(X=x_k)=1/n \text{ for } 0 \leq k < n.$$

That is, the event $X=x_k$ corresponds to $r \in [k/n, (k+1)/n)$. The probability equals the proportion of the total length of the sample space S contributed by $X=x_k$. Since the sample space S for X is the real interval [0,1), the total length of S is 1.0 and the probability is equal to the length of the interval, which is $(k+1-k)/n=1/n$, since the different values of X break the sample space S into n disjoint events of equal length. As such, if X has 2 states, $P(X=x_k)=0.5$ for $0 \leq k \leq 1$. As another example, if X has 5 states, $P(X=x_k)=0.2$ for $0 \leq k \leq 4$.

In an embodiment in which a child domain concept has a single parent domain concept, the computer system, such as the processing circuitry, of an example embodiment is configured to create one or more conditional probability tables by creating a conditional probability table defining the probabilistic causal relationship from the parent domain concept to the child domain concept by determining a probability of occurrence for a respective transition from each state of the parent domain concept to each state of the child domain concept. In this regard in which a child domain concept X has a single parent domain concept Y and in which the link, that is, the probabilistic causal relationship, from Y to X has weight 1, the conditional probability $P(X=x_k|Y=y_j)$ is defined as follows:

$$P(X=x_k|Y=y_j, w=1)=P(X=x_k \& Y=y_j)/P(Y=y_j).$$

That is, the conditional probability of the event $X=x_k$ given that $Y=y_j$ is equal to the intersection of the intervals corresponding to these events divided by the length of the interval corresponding to $Y=y_j$. In other words, the conditional probability of the event $X=x_k$ given that $Y=y_j$ is equal to the intersection of parent and child intervals divided by the size of the parent interval.

By way of example, in an instance in which Y has 5 states and X has 2 states, $P(X=x_0|Y=y_2)=|$Intersection of [0, 0.5) & [0.4, 0.6)$|/|0.6-0.4|=0.5$. In turn, the full conditional probability table (CPT) would be:

| P (x|y) | $x_0$ | $x_1$ |
|---|---|---|
| $y_0$ | 1 | 0 |
| $y_1$ | 1 | 0 |
| $y_2$ | 0.5 | 0.5 |
| $y_3$ | 0 | 1 |
| $y_4$ | 0 | 1 |

As another example, in an instance in which the parent domain concept is Z which has 3 states and X has 5 states, $P(X=x_0|Z=z_0)=|$Intersection of [0, 0.2) & [0, 0.33)$|/|0.33-0|=0.6$. In turn, the full conditional probability table (CPT) would be:

| P (x|z) | $x_0$ | $x_1$ | $x_2$ | $x_3$ | $x_4$ |
|---|---|---|---|---|---|
| $z_0$ | 0.6 | 0.4 | 0 | 0 | 0 |
| $z_1$ | 0 | 0.2 | 0.6 | 0.2 | 0 |
| $z_2$ | 0 | 0 | 0 | 0.4 | 0.6 |

As yet another example, in an instance in which the parent domain concept Y has 2 states and X has 5 states, $P(X=x_0|Y=y_0)=|$Intersection of [0, 0.2) & [0, 0.5)$|/|0.5-0|=0.2/0.5=0.4$. In turn, the full conditional probability table (CPT) would be:

| P (x\|y) | $x_0$ | $x_1$ | $x_2$ | $x_3$ | $x_4$ |
|---|---|---|---|---|---|
| $y_0$ | 0.4 | 0.4 | 0.2 | 0 | 0 |
| $y_1$ | 0 | 0 | 0.2 | 0.4 | 0.4 |

In an embodiment in which a child domain concept X has a single parent domain concept Y and in which the link, that is, the probabilistic causal relationship, from Y to X has weight that is different than 1, the conditional probability $P_{full}(X|y_j)$ is the distribution over the values of X given $Y=y_j$ under the assumption that the link from Y to X has weight w=1. With U(X) representing the uniform distribution over the values of X and the weight w being $0 \leq w < 1$, the conditional probability is expressed as:

$$P(X|y_j, 0 \leq w < 1) = w \cdot P_{full}(X|y_j) + (1-w) \cdot U(X)$$

That is, the conditional probability is a weighted combination of the probability in an instance in which the weight=1 (hereinafter referenced as the full-weight conditional distribution) and the uniform distribution, which serves as the default distribution if there were no parent domain concept. In other words, the magnitude of the weight is used as the probability that the full-weight conditional distribution should be used instead of the uniform distribution.

As an example, in an instance in which Y has 2 states and X has 5 state and the weight of the link is w=0.6, the conditional probability is as follows:

$$P(X = x_0 | Y = y_0) = w \cdot P_{full}(X | y_0) + (1 - w) \cdot U(x)$$
$$= 0.6 \cdot 0.4 + (1.0 - 0.6) \cdot (1/5)$$
$$= 0.24 + 0.4 \cdot 0.2 = 0.3 + .08 = 0.32$$

In turn, the full conditional probability table (CPT) would be:

| P (x\|y) | $x_0$ | $x_1$ | $x_2$ | $x_3$ | $x_4$ |
|---|---|---|---|---|---|
| $y_0$ | 0.32 | 0.32 | 0.2 | 0.08 | 0.08 |
| $y_1$ | 0.08 | 0.08 | 0.2 | 0.32 | 0.32 |

If the weight is negative, the direction of influence of the parent domain concept upon the child domain concept is reversed. If the parent domain concept Y is an m-valued variable, for example, the resulting distribution is determined using a similar calculation as that above but for the "opposed" value of the parent domain concept, that is for the value at the other side of the range. In other words for a range of values arranged in numerical, the opposed values are the values that are equally spaced but in opposite directions from the median. For example, the highest value is opposed to the lowest value, the second-highest is opposed to the second-lowest value, etc. More specifically, if the weight w<0, the conditional probability is as follows:

$$P(X|y_j, -1 \leq w < 0) = w \cdot P_{full}(X|y_{m-j-1}) + (1-w) \cdot U(X)$$

As a further example, in an instance in which Y has 2 states and X has 5 states and the weight of the link is w=−0.6, the conditional probability is as follows:

$$P(X=x_2|Y=y_1) = 0.6 \cdot 0.2 + (1.0-0.6) \cdot (1/5) = 0.12 + 0.4 \cdot 0.2 = 0.12 + 0.08 = 0.2$$

In turn, the full conditional probability table (CPT) would be:

| P (x\|y) | $x_0$ | $x_1$ | $x_2$ | $x_3$ | $x_4$ |
|---|---|---|---|---|---|
| $y_0$ | 0.08 | 0.08 | 0.2 | 0.32 | 0.32 |
| $y_1$ | 0.32 | 0.32 | 0.2 | 0.08 | 0.08 |

In an embodiment in which a child domain concept has a plurality of parent domain concepts, the computer system, such as the processing circuitry, of an example embodiment is configured to create one or more conditional probability tables by creating a conditional probability table defining the probabilistic causal relationship from the plurality of parent domain concepts to the child domain concept by determining a probability of occurrence for a respective transition from each combination of states of the parent domain concepts to each state of the child domain concept. In this regard in which a child domain concept has a plurality of parent domain concepts, it is assumed in an example embodiment that the influence of each parent domain concept upon the child domain concept is independent of the influence of other parent domain concepts upon the child domain concept. As such, if child domain concept X has parent domain concepts $Y^1, Y^2, \ldots, Y^N$, the conditional probability is defined as:

$$P(X|Y^1, Y^2, \ldots, Y^N) = c \cdot P(X|Y^1) \cdot P(X|Y^2) \cdot \ldots \cdot P(X|Y^N)$$

where c is normalization constant to make the distribution sum to 1.

As an example, the child domain concept X has 5 states and two parent domain concepts Y and Z. In this example, parent domain concept Y has 2 states and a weight 0.5 and parent domain concept Z has 3 states and a weight −0.5. As an initial step, the weights of the links and the fact that there are multiple parents are ignored such that the conditional probability for parent domain concept Z is:

$$P_{full}(X|z_0) = [0.6, 0.4, 0.0, 0.0, 0.0]$$

And the conditional probability for parent domain concept Y is:

$$P_{full}(X|y_0) = [0.4, 0.4, 0.2, 0.0, 0.0]$$

By adding in the effect of the weights on the probability distributions, the conditional probabilities are as follows:

$$P(X|z_0, w=-0.5) = [0.1, 0.1, 0.1, 0.3, 0.4]$$

and $$P(X|y_0, w=0.5) = [0.3, 0.3, 0.2, 0.1, 0.1]$$

Now, by combining both parent domain concepts Y and Z, the conditional probabilities are as follows:

$$P(X | y_0, z_0) = c \cdot P(X | y_0) \cdot P(X | z_0)$$
$$= c \cdot [0.3, 0.3, 0.2, 0.1, 0.1] \cdot [0.1, 0.1, 0.1, 0.3, 0.4]$$
$$= c \cdot [0.03, 0.03, 0.02, 0.03, 0.04]$$
$$= [0.2, 0.2, 0.13, 0.2, 0.27]$$

In turn, the full conditional probability table would be:

| P (x\|y, z) | $x_0$ | $x_1$ | $x_2$ | $x_3$ | $x_4$ |
|---|---|---|---|---|---|
| $y_0, z_0$ | 0.2 | 0.2 | 0.13 | 0.2 | 0.27 |
| $y_0, z_1$ | 0.15 | 0.3 | 0.4 | 0.1 | 0.05 |
| $y_0, z_2$ | 0.48 | 0.36 | 0.08 | 0.04 | 0.04 |

| P (x\|y, z) | $x_0$ | $x_1$ | $x_2$ | $x_3$ | $x_4$ |
|---|---|---|---|---|---|
| $y_1, z_0$ | 0.04 | 0.04 | 0.08 | 0.36 | 0.48 |
| $y_1, z_1$ | 0.05 | 0.1 | 0.4 | 0.3 | 0.15 |
| $y_1, z_2$ | 0.27 | 0.2 | 0.13 | 0.2 | 0.2 |

Figure 5B:
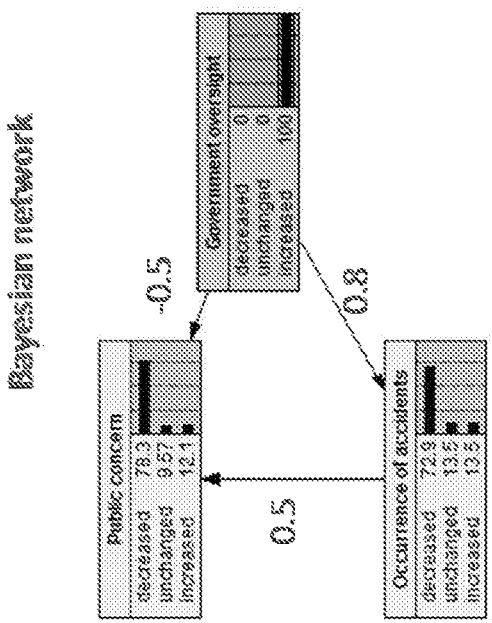
FIGS. 5B and 5C are examples of Bayesian networks that are created from the unconstrained model of FIG. 5A in response to different queries in accordance with an example embodiment of the present disclosure.
Figure 5B:
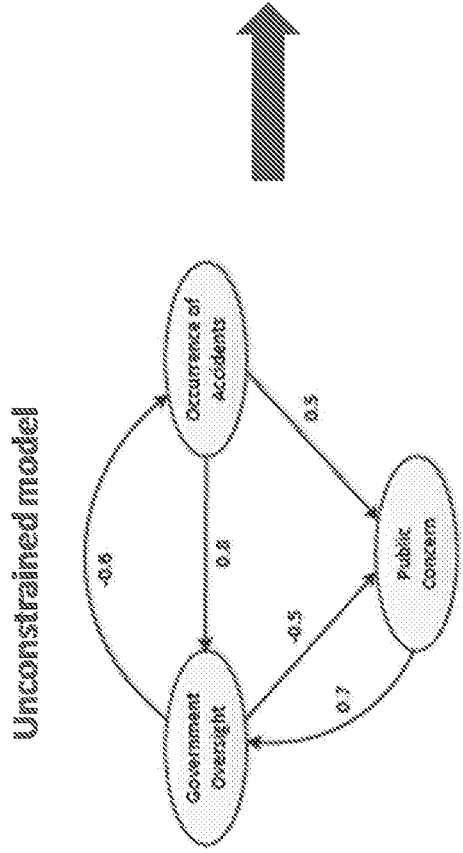
Figure 5C:
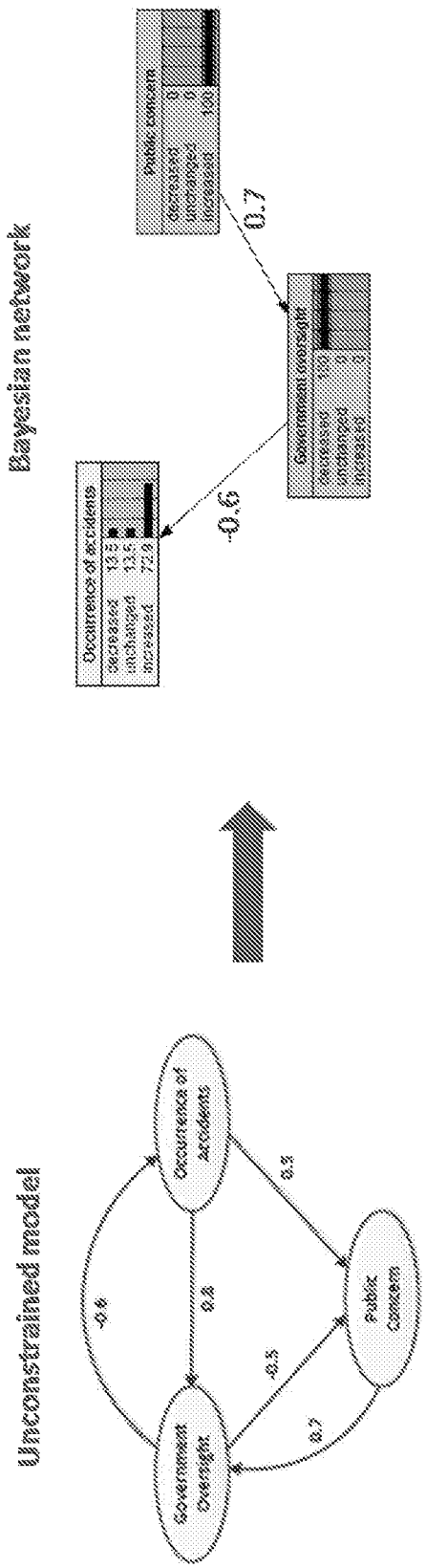

Based upon the query specific Bayesian network that is a result of the transformation of the unconstrained domain model in response to the query, the query specific Bayesian network may be utilized to support strategic decision making. For example, a query specific domain model may be utilized to determine when to launch a new product into a specific market, how close a country is to achieving nuclear weapon capability or whether an investment should be made in a particular emerging technology. In each of these examples, there are several variables that may be represented by a respective domain concepts and interrelationships between the variables that are represented by probabilistic causal relationships. In response to the definition of the variables and the relationships therebetween, such as provided by a user, a computer system, such as the processing circuitry, may create an unconstrained domain model and may then transform the unconstrained domain model in response to a query to create a query specific Bayesian network that may be utilized for strategic decision making in the context of the query. In this regard, FIGS. 5B and 5C illustrate two different Bayesian networks that are created from the unconstrained model of FIG. 5A in response to two different queries. For example, the Bayesian network of FIG. 5B is created in response to the query "What is the probability of Occurrence of Accidents given that Government Oversight is increased?" which leads to the answer that there is a 73% probability that the Occurrence of Accidents will decrease in response to an increase in Government Oversight. Similarly, the Bayesian network of FIG. 5C is created in response to the query "What is the probability of Occurrence of Accidents given that Public Concern is increased?" which leads to the answer that that there is a 73% probability that the Occurrence of Accidents will increase in response to an increase in Public Concern. In the example of FIG. 5C, it is noted that the decrease in Government Oversight is not a consequence of an increase in Public Concern and, instead, they are both evidence from which the probability of the Occurrence of Accidents is derived. Since the Occurrence of Accidents is independent of the Public Concern, the decrease in Government Oversight is the evidence that leads to the increase in the Occurrence of Accidents. By facilitating the generation of a Bayesian network, the computer system, method and computer program product helps to make accessible the process of using advance probabilistic models to reason through complex scenarios, thereby facilitating the making of probabilistic predictions in complex domains.

3. Text and Reasoning Processing

Once a formalized causal domain model is established, text and reasoning processing algorithms may operate based on the causal domain model, such as to process text and determine results. Text processing refers to performing text processes or text algorithms, such as embodied in a text processing tool or engine. Reasoning processing refers to performing reasoning processes or reasoning algorithms, such as embodied in a reasoning processing tool or engine typically including one or more inference algorithms. Text processing tools typically also involve inference algorithms for extraction of text data and identifying inferences from text. FIGS. 3A and 3B define other details related to performing reasoning processing. For example, aspects of performing reasoning processing include identifying trends and defining an initial model state for further prediction, validating the model, updating the model due to domain changes, and enhancing the model by discovering new dependencies, weights, etc.

The performance of reasoning processing shown in FIGS. 3A and 3B may be, for example, execution of the Bayesian network belief update algorithm or similar reasoning algorithm such as other inference algorithms. The performance of reasoning processing applies the formalized probabilistic causal domain model to specifically acquired text profiles, described further with respect to FIGS. 6A and 6B. The performance of deterministic and resultant reasoning processing requires that, either prior to or for the purpose of performing the deterministic or resultant reasoning processing, a domain expert or other user establish a query, as shown in block 22 of FIG. 1 and in FIGS. 2A and 2B. By establishing a query the domain expert or user establishes a change or event occurrence query and/or a set of implications of interest. A probabilistic causal domain model that has been transformed into a mathematical formalization and processed with reasoning and text algorithms in accordance with an established query for the probabilistic causal domain model can provide an output for knowledge driven decision support. For example, an embodiment of a system, method, or computer program for combining cognitive causal models with reasoning and text processing for knowledge driven decision support may provide an output that extracts an inference about causal implications of the current state of the domain as supported by text documents and the text profiles of the documents. Further, a query, such as identifying the probability of public concern about airline safety based upon the current state of the domain, supported by related documents, could generate an output that identifies that the probability of public concern about airline safety increasing is 59.8% and remaining unchanged is 40.2%, as shown in FIG. 3F. An output can predict critical events or model time dependent events. In addition, an embodiment of a system, method, or computer program for combining cognitive causal models with reasoning and text processing for knowledge driven decision support can summarize information about a prediction or modeling of an event or the extraction of an inference. The output of an embodiment of a system, method, and/or computer program for combining cognitive causal models with reasoning and text processing for knowledge driven decision support can then be used by a domain expert or a decision maker to assist in the decision making process.

Figure 6A:
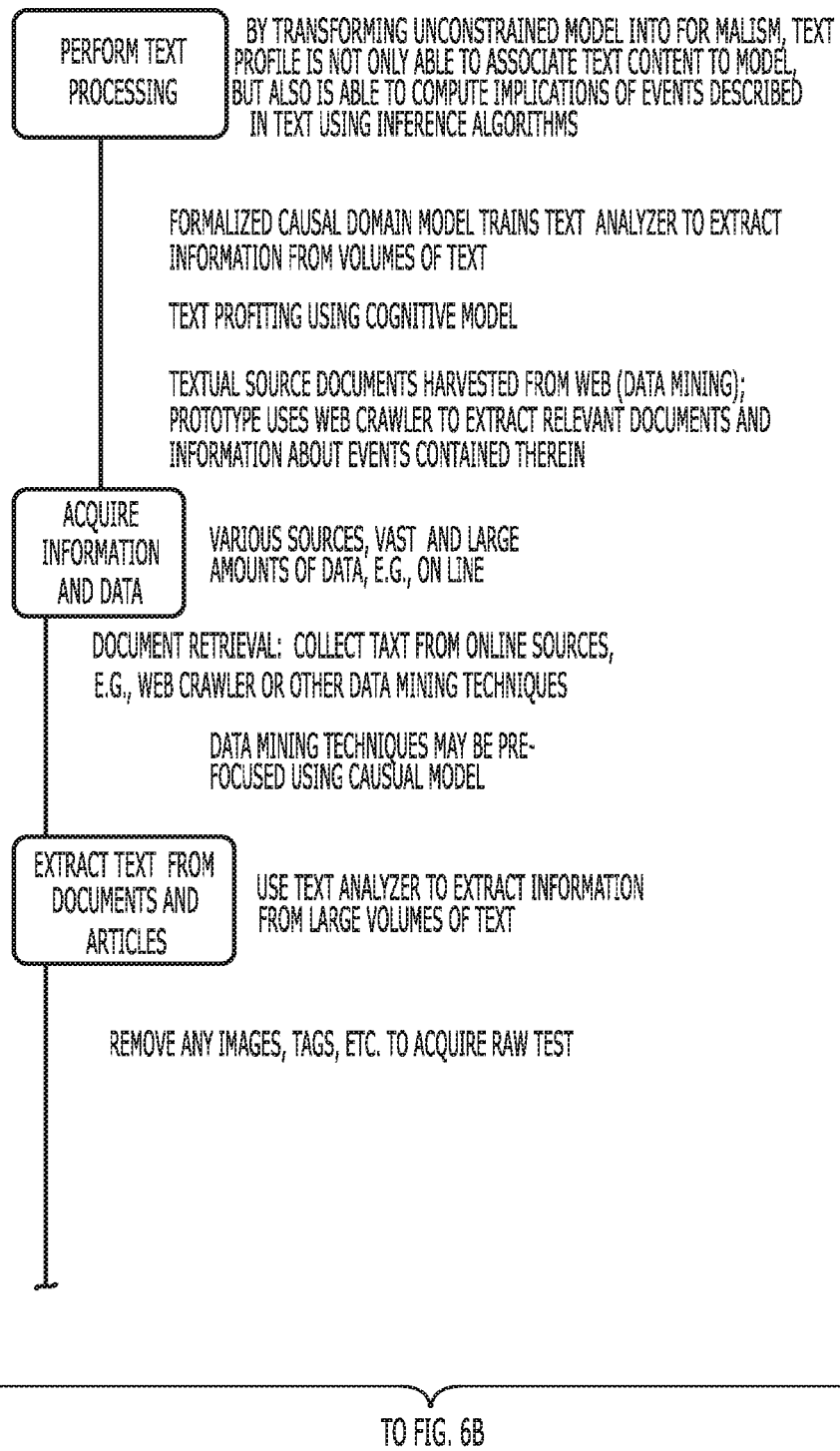
FIGS. 6A and 6B are diagrams of text processing.
Figure 6B:
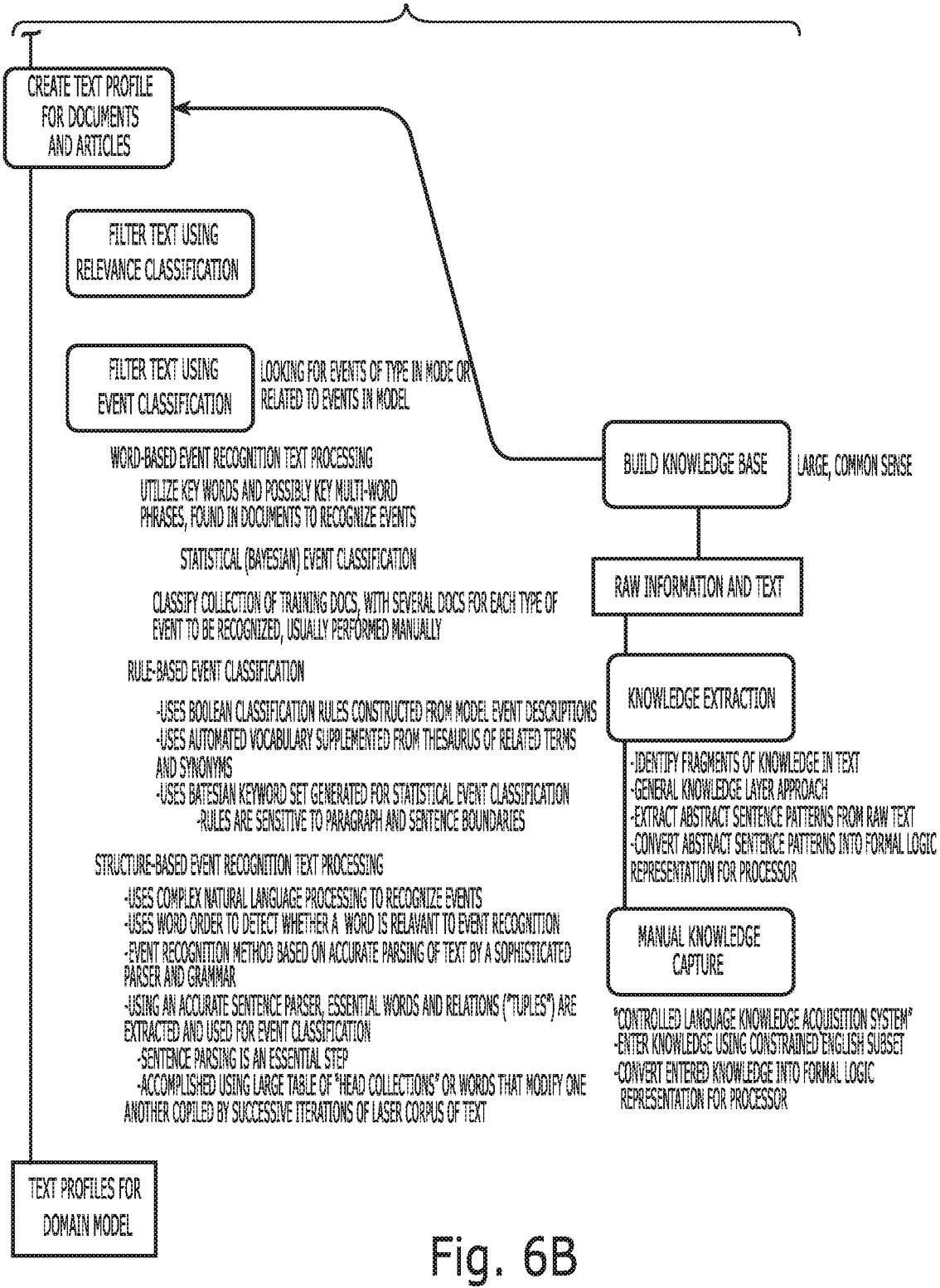

FIGS. 6A and 6B are diagrams of text processing. By transforming an unconstrained probabilistic causal domain model into a mathematical formalization, a text profile resulting from initial text processing is not only able to associate text content to the model such as by matching text content to the formalized model or identifying related words for domain concepts, but is also able to compute implications of interest, e.g., detecting trends, buried in the text using inference algorithms. Text processing of systems, methods, and computer programs for combining cognitive causal models with reasoning and text processing for knowledge driven decision support includes the concept that the formalized probabilistic causal domain model trains the text processing or text analyzer to extract information from text. The information in the formalized probabilistic causal domain model is used by the resulting text processing or text analyzer. Thus, systems, methods, and computer programs for combining cognitive causal models with reasoning and text processing for knowledge driven decision support may be described as text profiling using a cognitive model. Before text processing can begin, information and data is acquired upon which text processing can be performed. One advantageous feature of systems, methods, and computer programs for combining cognitive causal models with reasoning and text processing for knowledge driven decision support is the ability to evaluate large amounts of data. Text source documents may be harvested or data mined from the Internet and other sources. A web crawler can be used to extract relevant documents and information about events described by the documents from the Internet. Various methods of data mining may be used to acquire information and data upon which text processing of systems, methods, and computer programs for combining cognitive causal models with reasoning and text processing for knowledge driven decision support is performed. The term data mining has several meanings along a spectrum from data extraction, such as identifying and extracting relevant instances of a word or sections of text in a document, to finding an answer from a set of documents based on a domain model, to learning inferences that might be used in an inference engine. Typically data mining as used in the context of extraction of text refers to data extraction, but may also involve finding an answer or learning or identifying an inference. Typical data mining tools may also use inference algorithms, such as Bayesian classification of text for identifying text for extraction. The document retrieval process may be unrestricted or may be focused from the domain model. For example, a data mining technique or a web crawler may be focused by the related words or other information embodied in the domain model. Once information and data have been acquired, such as various documents or articles from the Internet, the text is typically extracted from the documents and articles either by extracting the text or removing images, tags, etc. to acquire raw text to which a text processor or a text analyzer may apply text processing algorithms. For example, the raw text data may be extracted through data mining or data mining may identify inferences in the text and extract such text required from the document to establish the inference for use by a text processing or reasoning processing algorithm. Typically, however, data mining of documents refers to extraction of text data for further analysis by a reasoning processing tool.

Once the information and data has been acquired and the text extracted from the information and data, a text profile is created for each text extraction. A filter using a relevance classification can be applied to all of the text extractions that have been acquired or retrieved. Using a relevance classification filter, text that is unrelated to the domain model may be filtered or removed from the text upon which the processing will be performed.

After relevance classification filtering of the extracted text, event classification filtering is applied to the remaining text. Event classification filtering looks for events of the type in the model or related to events in the model. The embodiment depicted in FIGS. 6A and 6B uses two types of event classification methods: word-based event recognition text processing and structure-based event recognition text processing. Word-based event recognition text processing utilizes related words found in documents to recognize events. Numerous text classification methods and tools are available, including beyond the Bayesian and rule-based methods. The embodiment of FIGS. 6A and 6B utilizes two types of word-based event classification text processing methods: statistical (Bayesian) event classification and rule-based event classification. These two types of word-based event classification text processing methods are used in tandem in the embodiment of FIGS. 6A and 6B. The statistical or Bayesian event classification takes advantage of an initial classification of training documents where several documents are used for classifying each type of event to be recognized. Classification of training documents is typically performed manually or semi-automatically. The statistical or Bayesian event classification may also use a classification generation program to automatically produce a statistical Bayesian classifier program which reproduces event assignments for training documents by specifying a set of related words and weights for each type of event in the model. The set of related words is also used to improve the Boolean rules classification as described further below. If a key word appears in a document, in statistical or Bayesian event classification, a key word weight is added to the accumulated weight of the document for an associated event type. If the total accumulated weight of the document exceeds a threshold, the associated event type may be assigned to the document. This associated event classification type assigned to a document is part of building the text profile for a document.

Rule-based event classification uses Boolean classification rules constructed from model event descriptions. Rule-based event classification also may use augmented vocabulary supplemented from a thesaurus of related terms and synonyms and may also use the Bayesian keyword set generated for statistical event classification.

Structure-based event recognition text processing uses complex natural language processing to recognize events. For example, structure-based event recognition text processing uses word order to detect whether a word is relevant to event recognition. This event recognition method is based on accurate parsing of text by a sophisticated parser and grammar. Using an accurate sentence parser, essential words and relations, or tuples, are extracted and used for event classification. Sentence parsing may be accomplished by using words that modify one another compiled by successive iterations of a large corpus of text, also referred to as a table of head collections.

As shown in FIGS. 6A and 6B, a common sense knowledge base, may supplement the creation of text profiles for documents and various aspects of text processing in general. For example, a knowledge base may be used for a vocabulary and/or grammar for analyzing documents. Further, a knowledge base related to a particular domain may be used with a probabilistic causal domain model of the same or a related domain. From raw information and text, knowledge may be extracted or captured. Knowledge extraction generally is automated or semi-automated, identifying fragments of knowledge and text. For example, a general knowledge layer approach may be used to extract knowledge from the text by extracting abstract sentence patterns from raw text, and the abstract sentence patterns can be converted into formal logic representations for processing. Manual knowledge capture can be performed for example using a controlled language knowledge acquisition system that allows a user or domain expert to enter knowledge using a constrained subset of the English language. The entered knowledge can then be converted into a formal logic representation for processing to supplement the reasoning and text processing.

II. Predictive Accuracy Using Temporal Relationships for Domain Models

One element of strategic decision support is the ability to make temporal predictions about when events may occur, in addition to whether events will occur. As mentioned above, some embodiments of the present disclosure may extend the use of probabilistic causal domain models to improve accuracy of temporal predictions of future events. Specifically, some embodiments of the present disclosure provide for more precise semantics to the definition of concept variables in a domain model, thereby building a more robust domain model to allow probabilistic reasoning about the future time of an event. Some embodiments of the present disclosure include temporal relationships between domain concepts that can be used to transform the domain model, including temporal relationships, into a Continuous Time Bayesian Network formalism for the domain model and which can be used in conjunction with the probabilistic causal domain model transformed into a Bayesian network formalism, such as a query specific Bayesian network.

An event or event occurrence can be a discrete event or a specific change perceived in a concept of interest. As used herein, the terms "event" and "event occurrence" are inclusive of a change occurrence, such that a specific change may be defined as an event. And a change occurrence, such as a change of an event occurrence, may be in either a positive or negative direction.

Figure 7:
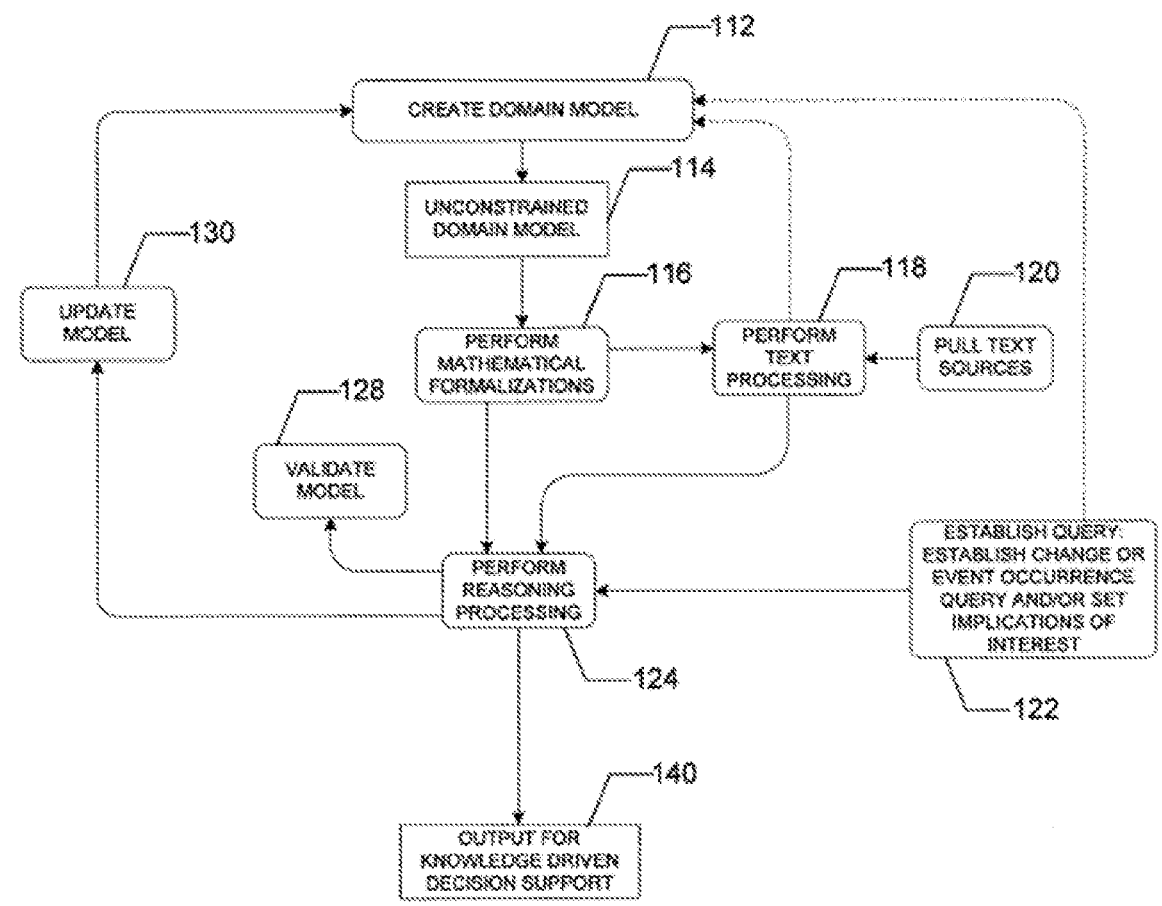
FIG. 7 is a diagram combining a probabilistic and temporal domain model with text and reasoning processing.

FIG. 7 is similar to the diagram of FIG. 1, except in FIG. 7 a domain model is created at block 112 that includes both probabilistic causal relationships and temporal relationships between domain concepts of the domain model of block 114. Like the unconstrained causal domain model 12 of FIG. 1, the unconstrained domain model 114 of FIG. 7 must be formalized into mathematical formalizations of the unconstrained domain model, as shown at block 116. However, in FIG. 1, the mathematical formalizations will be typically limited to transforming the unconstrained causal domain model 12 into a Bayesian network, such as a query specific Bayesian network, and possibly also a magnitude model. In the embodiment of FIG. 7, the mathematical formalizations will also include transforming the unconstrained domain model into a Continuous Time Bayesian Network relying upon expected time to effect parameters of the temporal relationships. Then, as in FIG. 1, once the mathematical formalizations are created, text processing and reasoning processing may be performed in accordance with the domain model, as shown at blocks 118 and 124, except that in FIG. 7, the reasoning processing 124 may also make accurate probabilistic predictions about when events may occur in the future in accordance with the temporal relationships of the domain model, which may be output at 140. The other elements of FIG. 7 are like those described for FIG. 1.

Figure 8:
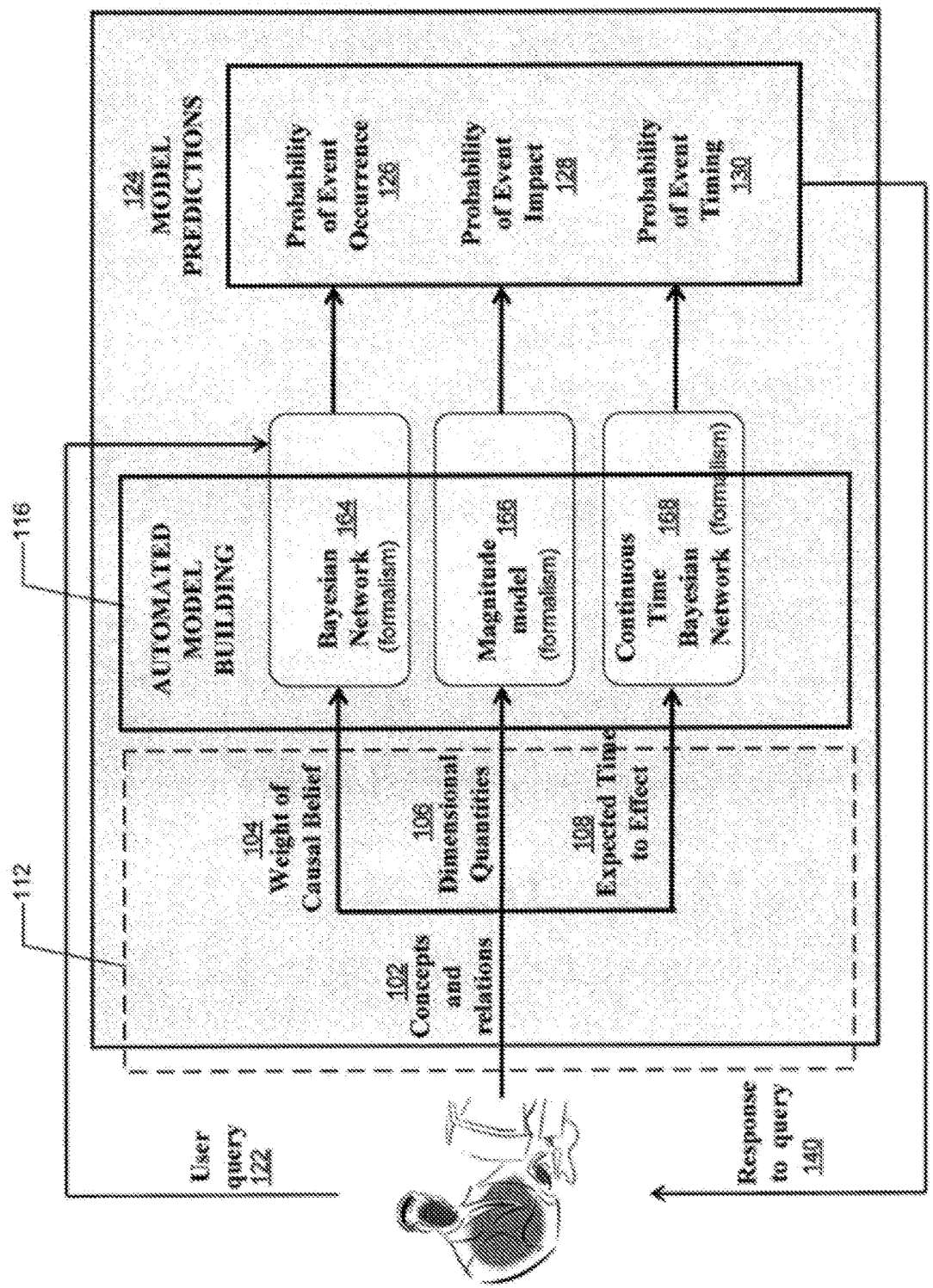
FIG. 8 is a diagram illustrating the creation of a domain model with probabilistic and temporal relationships, automated formalistic model building based upon the domain model, and predictive application of the formalistic models.

FIG. 8 provides a more detailed diagram illustrating the creation of a domain model with probabilistic and temporal relationships, automated formalistic model building based upon the domain model, and predictive application of the formalistic models. As illustrated in FIG. 8, the user, possibly supported by automated or semi-automated processes, creates the domain model 112 by providing domain concepts and relations for the domain concepts 102. As described above in relation to creating probabilistic causal domain models, probabilistic causal relationships between domain concepts include a weight of the causal belief 104. Similarly, as described above in relation to creating probabilistic causal domain models, relationships between domain concepts 102 may also include dimensional quantities 106 related to the magnitude of the domain concepts and relationship. Some embodiments of the present disclosure provide more precise semantics to the definition of relationships between domain concepts for the domain model by including a temporal value for the relationship, i.e., by defining a temporal relationship between domain concepts. This is expressed as an expected time to effect 108. Automated model building 116 occurs through mathematical formalizations of the domain model and characteristics thereof, including the weight of causal belief 104, dimensional quantities 106, and expected time to effect 108. Using the domain model and weight of causal believe values 104, a Bayesian network formalism 164 may be created. If the dimensional quantities 106 are included in the main model, a magnitude model formalism 166 may be created. Finally, some embodiments of the present disclosure transform the domain model with the expected time to effect 108 temporal relationships into a Continuous Time Bayesian Network formalism 168. Using the formalisms, model predictions 124 can provide probability of event occurrence 126 from the Bayesian network formalism 164, probability of event impacts 128 from the magnitude model formalism 166, and probability of event timing 130 from the Continuous Time Bayesian Network formalism 168. The output from the model predictions 124 provides a response to the user, such as a response 140 to a user query 120.

Figure 9:
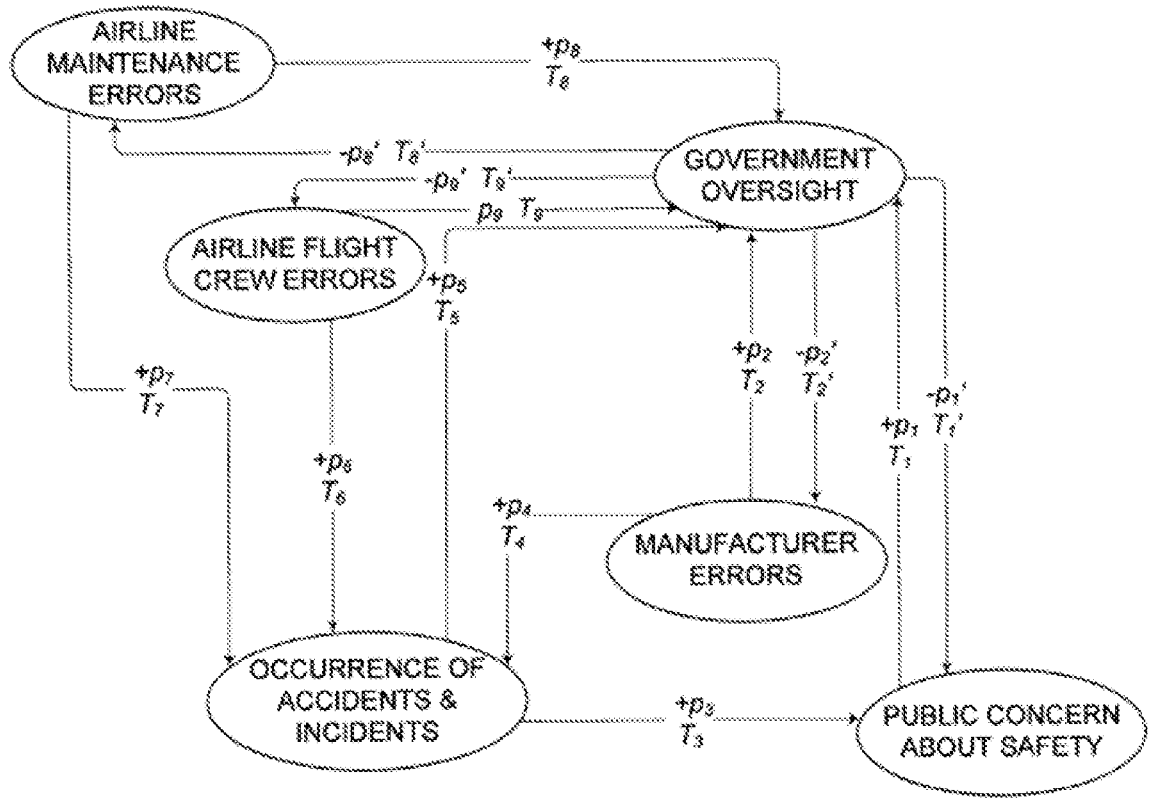
FIG. 9 is a pictorial representation of a portion of a focused unconstrained domain model with probabilistic and temporal relationships.

FIG. 9 is a pictorial representation of a portion of a focused unconstrained domain model with probabilistic and temporal relationships. Relationships between domain concepts are represented by directional line arrows. In the example of FIG. 9, each child-parent domain concept relationship pairing is defined by both a weight of causal belief value for the probabilistic causal relationship between the domain concepts and an expected time to effect for the temporal relationship between the domain concepts. The weights of causal belief values for the probabilistic causal relationships are represented as integer p. As described above in relation to creating probabilistic causal domain models, a weight of a causal belief may be either positive or negative and have a magnitude from the range of −1 to 0 to +1. An expected time to effect for the temporal relationship may be any distinct value of time, such as 10 minutes, 6 hours, 2 days, 4 weeks, 9 months, etc., or may be labeled as having an instant effect. And expected time to effect for a temporal relationship represents the expected amount of time for the effect of the child domain concept to take place based upon the parent domain concept. According to the additional semantics for temporal relationships in a domain model provided for by some embodiments of the present description, the magnitude of the weight of causal belief is a probability and the expected time to effect is a parameter which together define a probability distribution over time.

Although corresponding child-parent domain concepts and parent-child domain concepts are illustrated in FIG. 8 with like subscript numbering and prime indications, the values do not need to be the same or even related. The likeness in subscripts and prime indications are included for simplicity in identifying corresponding child-parent domain concepts and parent-child domain concepts. For example, the two relationships between the domain concepts Government Oversight and Manufacture Errors include a first relationship from parent domain concept Manufacture Errors to child domain concept Government Oversight with a weight of causal belief value+$p_2$ and expected time to effect value $T_2$ and a second relationship from parent domain concept Government Oversight to child domain concept Manufacture Errors with a weight of causal belief value −$p_2'$ and expected time to effect value $T_2'$. The weight of causal belief values +$p_2$ and $p_2'$ need not have any correlation, and are likely to be independent values. Similarly, the expected time to effect values $T_2$ and $T_2'$ need not have any correlation, and are likely to be independent values.

As described above, both Continuous Time Bayesian Networks and domain models allow for use of directed cyclic graphs. Thus, transforming a domain model including probabilistic causal relationships and temporal relationships between domain concepts includes creation of a local conditional intensity matrix (CIM) for each child domain concept in a parent-child domain concept relationship pairing, such as described above. For example, in a relationship between parent domain concept X and child domain concept Y, where the relationship has a positive weight of causal belief p and expected time to effect T, then the local conditional intensity matrix is created for which when $X=x_1$, then Y transitions from $y_0$ to $y_1$ with probability p and expected time T and when $X=x_0$, then Y transitions from $y_1$ to $y_0$ with probability p and expected time T. By contrast, if the weight of causal belief value is negative p and expected time to effect T, then the local conditional intensity matrix is created for which when $X=x_1$, then Y transitions from $y_1$ to $y_0$ with probability p and expected time T and when $X=x_0$, then Y transitions from $y_0$ to $y_1$ with probability p and expected time T.

If there are more than one parent domain concepts for a child domain concept, and thus more than one parent-child domain concept relationship pairing, individual conditional intensity matrices are created for each child-parent relationship pairing and those conditional intensity matrices are amalgamated by matrix addition to form a single, complete conditional intensity matrix for the child domain concept. The single, complete conditional intensity matrix for the child domain concept describes the total behavior of the child domain concept as a function of its parent domain concepts. For example, if there are multiple parent domain concepts $X_1, X_2, \ldots, X_n$, transforming the unconstrained domain model into a Continuous Time Bayesian Network formalism for the domain model representing the temporal relationships follows the convention that the variable represents a range and each value corresponds to the extent to which that variable is increasing or decreasing. A positive weight of causal belief p means that with probability p an increasing or occurring X leads to an increasing or occurring Y and a decreasing or not-occurring X leads to a decreasing or not-occurring Y and, by contrast, a negative weight of causal belief p means that with probability p an increasing or occurring X leads to a decreasing or not-occurring Y and a decreasing or not-occurring X leads to an increasing or occurring Y. In each of these cases, the distribution over when the effect occurs has the time to effect parameter T as its mean value.

III. Embodiments of Systems of the Present Disclosure

Figure 10:
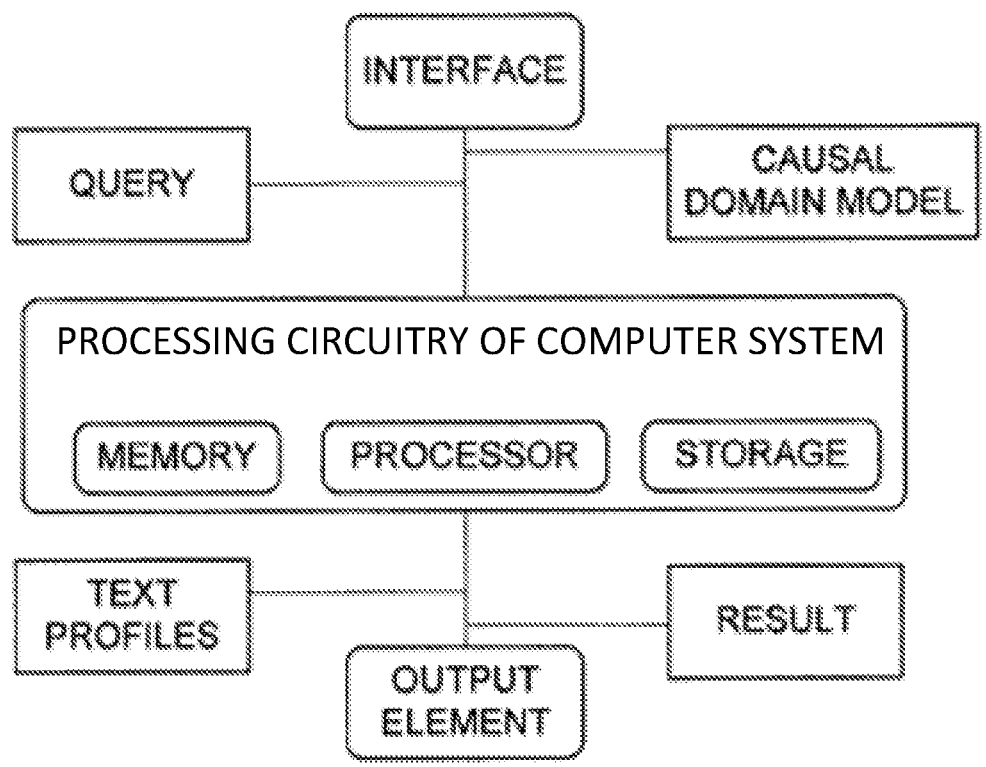
FIG. 10 is a diagram of a knowledge driven decision support system.

FIG. 10 is a diagram of improved systems, methods, and computer programs to facilitate predictive accuracy for strategic decision support that may be used for analyzing large amounts of textual data. An example embodiment of a system to facilitate predictive accuracy for strategic decision support may include an interface for receiving input relating to the creation of a domain model with probabilistic causal relationships and, in some embodiments, temporal relationships. The interface may be a graphical user interface or other type of interface that allows for receiving input by a domain expert or user. For example, an interface may allow for a user to input information via the Internet. In addition, an interface may allow input relating to the definition of a query.

Figure 11:
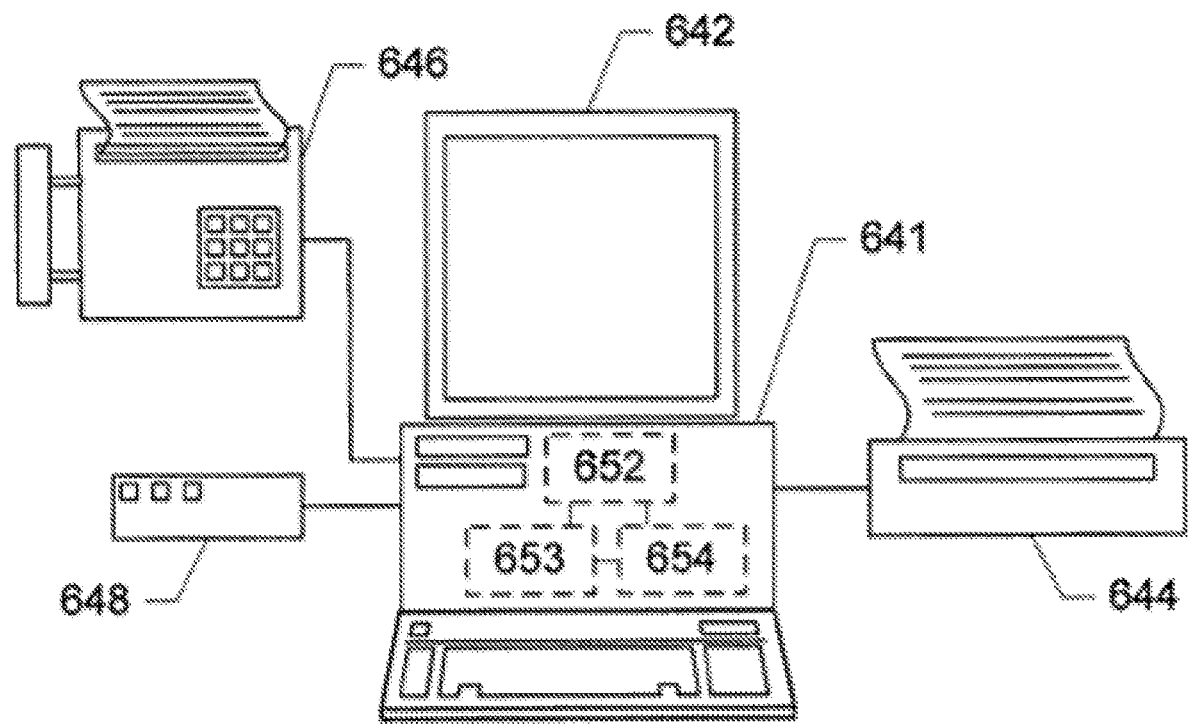
FIG. 11 is a schematic block diagram of a knowledge driven decision support system.

An embodiment of a system to facilitate predictive accuracy for strategic decision support may also include processing circuitry of a computer system, such as a processor 652, memory 653, and storage 654 of a computer system 641, as shown in FIG. 11, for transforming a domain model into mathematical formalizations of the domain model including a query specific Bayesian network, acquiring documents and processing text of the documents in accordance with the domain model to create text profiles, and performing reasoning analysis upon the text profiles in accordance with the domain model using the mathematical formalizations of the domain model to derive a result. The processing circuitry of a computer system, including the processor 652, typically operates under software control, where the software is stored in memory 653 or storage 654, where all, or portions, of a corpus of documents is typically also stored. As used herein, memory 653 and storage 654 are generally and collectively referenced as a memory device.

In an example embodiment, the processing circuitry is in communication with the memory device via a bus for passing information among components of the computer system. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computer system like the processing circuitry). The memory device may be configured to store information, data, content, applications, instructions, or the like for enabling the computer system to carry out various functions in accordance with an example embodiment of the present disclosure. For example, the memory device could be configured to buffer input data for processing by the processing circuitry. Additionally or alternatively, the memory device could be configured to store instructions, e.g., code, for execution by the processing circuitry in order to transform an unconstrained domain model into a query specific Bayesian network.

The processing circuitry may be embodied in a number of different ways. For example, the processing circuitry may be embodied as one or more of various hardware processing means such as one or more processors, a coprocessor, a microprocessor, a controller, a digital signal processor (DSP), a processing element with or without an accompanying DSP, or various other types of processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processing circuitry may be configured to execute instructions, e.g., code, stored in the memory device or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, the computing device). The processing circuitry may include, among other things, a clock, an arithmetic logic unit (ALU) and logic gates configured to support operation of the processing circuitry.

A computer system can also include a display 642 for presenting information relative to performing and/or operating systems, methods, and computer programs facilitating predictive accuracy for strategic decision support. The computer system 641 can further include a printer 644. Also, the computer system 641 can include a means for locally or remotely transferring the information relative to performing and/or operating systems, methods, and computer programs to facilitate predictive accuracy for strategic decision support. For example, the computer system can include a facsimile machine 646 for transmitting information to other facsimile machines, computers, or the like. Additionally, or alternatively, the computer system can include a modem 648 to transfer information to other computers or the like. Further, the computer system can include an interface to a network, such as a local area network (LAN), and/or a wide area network (WAN). For example, the computer can include an Ethernet Personal Computer Memory Card International Association (PCMCIA) card configured to transmit and receive information, wirelessly and via wireline, to and from a LAN, WAN, or the like.

Typically, computer program instructions may be loaded onto the computer system 641 or other programmable apparatus to produce a machine, such that the instructions which execute on the computer or other programmable apparatus create means for implementing functions specified with respect to embodiments of improved systems, methods, and computer programs to facilitate predictive accuracy for strategic decision support, such as including a computer-useable medium having control logic stored therein for causing the processing circuitry to transform an unconstrained domain model into a query specific Bayesian network for the domain model using at least the domain concepts and temporal relationships. These computer program instructions may also be stored in a computer-readable memory, such as system memory 653, that can direct a computer system or other programmable apparatus to function in a particular manner, such that the instructions stored in the computer-readable memory produce an article of manufacture including instruction means which implement functions specified with respect to embodiments of systems, methods, and computer programs to facilitate predictive accuracy for strategic decision support. The computer program instructions may also be loaded onto the computer or other programmable apparatus to cause a series of operational steps to be performed on the computer system 641 or other programmable apparatus to produce a computer implemented process such that the instructions which execute on the computer system 641 or other programmable apparatus provide steps for implementing functions specified with respect to embodiments of systems, methods, and computer programs to facilitate predictive accuracy for strategic decision support.

As described above, flowcharts and other illustrations of the transformation of an unconstrained domain model into a Bayesian network, such as a query specific Bayesian network as shown in FIG. 4 are provided in the context of a computer system including processing circuitry, a method and a computer program product according to example embodiments of the present disclosure. It will be understood that each block of the flowchart, and combinations of blocks in the flowchart, may be implemented by various means, such as hardware, firmware, processor, circuitry, and/or other communication devices associated with execution of software including one or more computer program instructions, e.g., code. For example, one or more of the procedures described above may be embodied by computer program instructions. In this regard, the computer program instructions which embody the procedures described above may be stored by a memory device of an embodiment of the present disclosure and executed by processing circuitry of the computer system. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

As a result of the domain model derived from the interface and the processing circuitry of a computer system transforming the domain model into mathematical formalisms, such as a query specific Bayesian network, e.g., a query specific Continuous Time Bayesian Network formalism, and performing textual and reasoning processing upon text profiles, a system to facilitate predictive accuracy for strategic decision support is configured to provide a result. The result may be provided by an output element, such as a display or monitor. However, an output element may also be embodied by such devices as printers, fax output, and other manners of output such as including email that may advantageously be used to update a user or domain expert at a subsequent time after a query has been established for a domain model. A result may be as simple as a text message, such as a text message indicating excessive occurrences of airline accidents and incidents in the particular time frame. However, results may be substantially more complex and involve various text and reasoning processing algorithms to provide knowledge driven decision support. Systems, methods, and computer programs to facilitate predictive accuracy for strategic decision support may be used in varying domains for various applications to derive various results.

By employing a system, method, and/or computer program to facilitate predictive accuracy for strategic decision support in accordance with an example embodiment, a domain expert or user is provided the analytic capability to present queries to a domain model about the effect and time to effect that perceived changes in domain concepts, detected from a collection of articles associated with the domain, may have on other concepts of interest. In other words, systems, methods, and computer programs to facilitate predictive accuracy for strategic decision support of an example embodiment provide the ability to quantify the likelihood, extent, and time to effect that may be expected to occur in certain quantities of interest as a result of changes perceived in other quantities. A corresponding computer program or software tool may embody the previously described functions and aspects of systems, methods, and computer programs to facilitate predictive accuracy for strategic decision support. For example, a non-transitory computer-useable medium can include control logic for performing a mathematical formalism algorithm or a reasoning processing algorithm, whereby such control logic is referred to as a mathematical formalism tool and a reasoning tool. Similarly, a non-transitory computer-useable medium can include control logic for receiving input and providing output, referred to as an input tool and an output tool. A tool may include software, hardware, or a combination of software and hardware to perform the described functions and aspects of embodiments of systems, methods, and computer programs to facilitate predictive accuracy for strategic decision support. A tool may comprise a separate processing portion of a computer system or function with the processing circuitry of a computer system.

Accordingly, embodiments of the present disclosure provide improved systems, methods, and computer programs to facilitate predictive accuracy for strategic decision support. Embodiments of the present disclosure make it possible for a domain expert to build a domain model that captures the knowledge of the domain expert about the probabilistic and, in some embodiments, temporal relationships of the domain. With such knowledge of probabilistic relationships about the domain captured in a domain model, embodiments of the present disclosure make possible the use of advanced probabilistic models to reason about complex scenarios and the timing of events without the need for advanced training. More specifically, embodiments of the present disclosure simplify the effort involved in building a Bayesian network, such as a query specific Bayesian network of a domain model for making probabilistic predictions. To provide such functionality, embodiments of the present disclosure provide a semantic for probabilistic and, in some embodiments, temporal relationships that can be translated into a functioning Bayesian network, such as a query specific Bayesian network, such as a query specific Continuous Time Bayesian Network formalism. Embodiments of the present disclosure may use a domain model to create a combination of a Bayesian network formalization of the causal probabilistic relationships of the domain, such as a query specific Bayesian network, and a Continuous Time Bayesian Network formalization of the temporal relationships of expected times to effects of the domain.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of a decision support system, comprising:
providing an unconstrained domain model defined by domain concepts and causal relationships between the domain concepts, wherein each causal relationship includes a value for the weight of causal belief for the causal relationship;
transforming, using processing circuitry and in response to a query, the unconstrained domain model into a query specific Bayesian network for the domain model by identifying one or more cycles in the unconstrained domain model; eliminating the one or more cycles from the unconstrained domain model; identifying a subgraph of the unconstrained domain model that is relevant to the query and creating one or more conditional probability tables that comprise the query specific Bayesian network,
wherein eliminating the one or more cycles comprises identifying the causal relationships between the domain concepts that are weak relative to other causal relationships in the unconstrained domain model as a result of having a weight with an absolute value that fails to satisfy a predefined threshold that is based upon a representation of the weights of a plurality of the causal relationships in the unconstrained domain model, and removing the causal relationships between the domain concepts that are identified to be weak; and
utilizing the query specific Bayesian network to analyze textual data by performing textual and reasoning processing and to provide output based upon probabilistic predictions based thereupon.

2. The method of claim 1, wherein identifying the subgraph of the unconstrained domain model comprises pruning domain concepts that are irrelevant to the query.

3. The method of claim 1 wherein identifying the subgraph of the unconstrained domain model comprises identifying the domain concepts that are relevant to the query.

4. The method of claim 1, wherein identifying one or more cycles in the unconstrained domain model comprises identifying all cycles in the unconstrained domain model, and wherein eliminating the one or more cycles from the unconstrained domain model comprises eliminating all cycles from the unconstrained domain model.

5. The method of claim 1, wherein creating one or more conditional probability tables comprises creating a conditional probability table defining the causal relationship from a parent domain concept to a child domain concept by determining a probability of occurrence for a respective transition from each state of the parent domain concept to each state of the child domain concept.

6. The method of claim 1, wherein creating one or more conditional probability tables comprises creating a conditional probability table defining the causal relationship from a plurality of parent domain concepts to a child domain concept by determining a probability of occurrence for a respective transition from each combination of states of the parent domain concepts to each state of the child domain concept.

7. A decision support system, comprising:
a memory configured to provide an unconstrained domain model defined by domain concepts and causal relationships between the domain concepts, wherein each causal relationship includes a value for the weight of causal belief for the causal relationship; and
processing circuitry configured to transform, in response to a query, the unconstrained domain model into a query specific Bayesian network for the domain model by identifying one or more cycles in the unconstrained domain model; eliminating the one or more cycles from the unconstrained domain model; identifying a sub-graph of the unconstrained domain model that is relevant to the query and creating one or more conditional probability tables that comprise the query specific Bayesian network,
wherein eliminating the one or more cycles comprises identifying the causal relationships between the domain concepts that are weak relative to other causal relationships in the unconstrained domain model as a result of having a weight with an absolute value that fails to satisfy a predefined threshold that is based upon a representation of the weights of a plurality of the causal relationships in the unconstrained domain model, and removing the causal relationships between the domain concepts that are identified to be weak,
wherein the processing circuitry is configured to utilize the query specific Bayesian network to analyze textual data by performing textual and reasoning processing and to provide output based upon probabilistic predictions based thereupon.

8. The decision support system of claim 7, wherein the processing circuitry is configured to identify the sub-graph of the unconstrained domain model by pruning domain concepts that are irrelevant to the query.

9. The decision support system of claim 7 wherein the processing circuitry is configured to identify the sub-graph of the unconstrained domain model by identifying the domain concepts that are relevant to the query.

10. The decision support system of claim 7, wherein the processing circuitry is configured to identify one or more cycles in the unconstrained domain model by identifying all cycles in the unconstrained domain model, and wherein the processing circuitry is configured to eliminate the one or more cycles from the unconstrained domain model by eliminating all cycles from the unconstrained domain model.

11. The decision support system of claim 7, wherein the processing circuitry is configured to create one or more conditional probability tables by creating a conditional probability table defining the causal relationship from a parent domain concept to a child domain concept by determining a probability of occurrence for a respective transition from each state of the parent domain concept to each state of the child domain concept.

12. The decision support system of claim 7, wherein the processing circuitry is configured to create one or more conditional probability tables by creating a conditional probability table defining the causal relationship from a plurality of parent domain concepts to a child domain concept by determining a probability of occurrence for a respective transition from each combination of states of the parent domain concepts to each state of the child domain concept.

13. A computer program product of a decision support system comprising a non-transitory computer-useable medium having control logic stored therein, the control logic comprising:

a first code configured to providing an unconstrained domain model defined by domain concepts and causal relationships between the domain concepts, wherein each causal relationship includes a value for the weight of causal belief for the causal relationship; and
a second code configured to transform, in response to a query, the unconstrained domain model into a query specific Bayesian network for the domain model by identifying one or more cycles in the unconstrained domain model; eliminating the one or more cycles from the unconstrained domain model; identifying a sub-graph of the unconstrained domain model that is relevant to the query and creating one or more conditional probability tables that comprise the query specific Bayesian network,
wherein eliminating the one or more cycles comprises identifying the causal relationships between the domain concepts that are weak relative to other causal relationships in the unconstrained domain model as a result of having a weight with an absolute value that fails to satisfy a predefined threshold that is based upon a representation of the weights of a plurality of the causal relationships in the unconstrained domain model, and removing the causal relationships between the domain concepts that are identified to be weak,
wherein the query specific Bayesian network is configured to analyze textual data by performing textual and reasoning processing and to provide output based upon probabilistic predictions based thereupon.

14. The computer program product of claim 13, wherein the second code is configured to identify the sub-graph of the unconstrained domain model by pruning domain concepts that are irrelevant to the query.

15. The computer program product of claim 13, wherein the second code is configured to identify one or more cycles in the unconstrained domain model by identifying all cycles in the unconstrained domain model, and wherein the second code is configured to eliminate the one or more cycles from the unconstrained domain model by eliminating all cycles from the unconstrained domain model.

16. The computer program product of claim 13, wherein the second code is configured to create one or more conditional probability tables by creating a conditional probability table defining the causal relationship from a parent domain concept to a child domain concept by determining a probability of occurrence for a respective transition from each state of the parent domain concept to each state of the child domain concept.

17. The computer program product of claim 13, wherein the second code is configured to create one or more conditional probability tables by creating a conditional probability table defining the causal relationship from a plurality of parent domain concepts to a child domain concept by determining a probability of occurrence for a respective transition from each combination of states of the parent domain concepts to each state of the child domain concept.

18. The method of claim 1 wherein the unconstrained domain model comprises child domain concepts and parent domain concepts, and wherein, in an instance in which a child domain concept has a plurality of parent domain concepts, defining a conditional intensity matrix for each child-parent relationship pairing and amalgamating the conditional intensity matrices by matrix addition.

19. The system of claim 7 wherein the unconstrained domain model comprises child domain concepts and parent domain concepts, and wherein, in an instance in which a child domain concept has a plurality of parent domain concepts, the processing circuitry is further configured to define a conditional intensity matrix for each child-parent relationship pairing and amalgamate the conditional intensity matrices by matrix addition.

20. The computer program product of claim 13 wherein the unconstrained domain model comprises child domain concepts and parent domain concepts, and wherein, in an instance in which a child domain concept has a plurality of parent domain concepts, the second code is further configured to define a conditional intensity matrix for each child-parent relationship pairing and amalgamate the conditional intensity matrices by matrix addition.

* * * * *